US009660486B2

(12) United States Patent
Lee et al.

(10) Patent No.: US 9,660,486 B2
(45) Date of Patent: May 23, 2017

(54) WIRELESS POWER TRANSFER DEVICE AND WIRELESS CHARGING SYSTEM HAVING SAME

(71) Applicant: LG ELECTRONICS INC., Seoul (KR)

(72) Inventors: Jaesung Lee, Seoul (KR); Seonghun Lee, Seoul (KR); Yongcheol Park, Seoul (KR); Bongsik Kwak, Seoul (KR); Jeongkyo Seo, Seoul (KR); Hyunbeom Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 200 days.

(21) Appl. No.: 14/400,265

(22) PCT Filed: May 14, 2013

(86) PCT No.: PCT/KR2013/004262
§ 371 (c)(1),
(2) Date: Nov. 10, 2014

(87) PCT Pub. No.: WO2013/172630
PCT Pub. Date: Nov. 21, 2013

(65) Prior Publication Data

US 2015/0137746 A1 May 21, 2015

Related U.S. Application Data

(60) Provisional application No. 61/646,713, filed on May 12, 2014.

(51) Int. Cl.
*H02J 7/00* (2006.01)
*H02J 17/00* (2006.01)
(Continued)

(52) U.S. Cl.
CPC .............. *H02J 17/00* (2013.01); *H02J 5/005* (2013.01); *H02J 7/0004* (2013.01); *H02J 7/025* (2013.01); *H02J 50/12* (2016.02); *H01F 38/14* (2013.01)

(58) Field of Classification Search
CPC .......... H02J 5/005; H02J 5/025; H02J 7/0004; B60L 11/182; B60L 11/1816; B60L 11/1829
(Continued)

(56) References Cited

U.S. PATENT DOCUMENTS

| | | | |
|---|---|---|---|
| 4,467,622 | A | 8/1984 | Takahashi et al. |
| 2004/0237565 | A1 | 12/2004 | Lee et al. |

(Continued)

FOREIGN PATENT DOCUMENTS

| | | |
|---|---|---|
| CN | 102099965 | 6/2011 |
| CN | 102318214 | 1/2012 |

(Continued)

OTHER PUBLICATIONS

PCT International Application No. PCT/KR2013/004262, Written Opinion of the International Searching Authority dated Aug. 28, 2013, 11 pages.

(Continued)

*Primary Examiner* — Paul Dinh
(74) *Attorney, Agent, or Firm* — Lee, Hong, Degerman, Kang & Waimey PC

(57) ABSTRACT

The present specification provides a wireless power transfer device formed to transmit power to a wireless power reception device, and a power transfer unit in the wireless power transfer device comprises: a first coil formed to generate a magnetic field so as to transmit power in an induction scheme; and a second coil wound around the first coil and
(Continued)

formed to generate a magnetic field vibrating at a resonance frequency so as to transmit power in a resonance scheme.

19 Claims, 31 Drawing Sheets

(51) Int. Cl.
*H02J 5/00* (2016.01)
*H02J 7/02* (2016.01)
*H02J 50/12* (2016.01)
*H01F 38/14* (2006.01)

(58) Field of Classification Search
USPC .......................................................... 320/108
See application file for complete search history.

(56) References Cited

U.S. PATENT DOCUMENTS

| | | | | |
|---|---|---|---|---|
| 2010/0225272 | A1 | 9/2010 | Kirby et al. | |
| 2010/0248622 | A1 | 9/2010 | Lyell Kirby et al. | |
| 2013/0241300 | A1* | 9/2013 | Miyamoto | H01F 5/003 307/104 |
| 2014/0015338 | A1* | 1/2014 | Yoshino | H02J 5/005 307/104 |
| 2014/0080431 | A1* | 3/2014 | Wada | H01P 1/387 455/91 |
| 2014/0346229 | A1* | 11/2014 | Kawahara | G01S 3/00 235/440 |
| 2015/0236517 | A1* | 8/2015 | Deguchi | H02J 5/005 307/104 |

FOREIGN PATENT DOCUMENTS

| | | |
|---|---|---|
| CN | 102414955 | 4/2012 |
| GB | 695696 | 8/1953 |
| KR | 10-2010-0004599 | 1/2010 |
| KR | 10-2011-0033279 | 3/2011 |
| KR | 10-2011-0135334 | 12/2011 |
| KR | 10-2012-0047027 | 5/2012 |
| WO | 2008/130115 | 10/2008 |
| WO | 2009/063975 | 5/2009 |

OTHER PUBLICATIONS

European Patent Office Application Serial No. 13790255.7, Search Report dated Jan. 15, 2016, 8 pages.
The State Intellectual Property Office of the People's Republic of China Application Serial No. 201380025413.9, Office Action dated Mar. 3, 2016, 21 pages.

* cited by examiner (a)

CONFIGURATION PACKET

5400

| | b7 | b6 | b5 | b4 | b3 | b2 | b1 | b0 |
|---|---|---|---|---|---|---|---|---|
| B0 | HEADER (5420) | | | | | | | |
| B1 | POWER CLASS (5431) | MAXIMUM POWER (5432) | | | | | | |
| B2 | RESERVED | | | | | | | |
| B3 | PROP (5433) | RESERVED | | | | COUNT (5434) | | |
| B4 | RESERVED | | | | | | | |
| B5 | | | | | | | | |

CONTROL ERROR PACKET

5500

| | b7 | b6 | b5 | b4 | b3 | b2 | b1 | b0 |
|---|---|---|---|---|---|---|---|---|
| B0 | HEADER (5520) | | | | | | | |
| B1 | CONTROL ERROR VALUE (5530) | | | | | | | |

FIG. 18

END POWER TRANSFER PACKET

5600

| | b7 | b6 | b5 | b4 | b3 | b2 | b1 | b0 |
|---|---|---|---|---|---|---|---|---|
| B0 | HEADER (5620) | | | | | | | |
| B1 | END POWER TRANSFER CODE (5630) | | | | | | | |

WPC COMMUNICATION FLOWCHART

WIRELESS POWER TRANSFER DEVICE AND WIRELESS CHARGING SYSTEM HAVING SAME

CROSS-REFERENCE TO RELATED APPLICATIONS

This application is the National Stage filing under 35 U.S.C. 371 of International Application No. PCT/KR2013/004262, filed on May 14, 2013, which claims the benefit of U.S. Provisional Application Ser. No. 61/646,713, filed on May 14, 2012, the contents of which are hereby incorporated by reference herein in their entirety.

TECHNICAL FIELD

The present disclosure relates to wireless power transfer, and more particularly, a wireless power transmitter (or a wireless power transfer device), which transfers wireless power by an induction method (or an induction scheme) and a resonance method (or a resonance scheme) in wireless power transfer, and a communication method thereof.

BACKGROUND ART

In recent years, the method of contactlessly supplying electrical energy to wireless power receivers in a wireless manner has been used instead of the traditional method of supplying electrical energy in a wired manner. The wireless power receiver receiving energy in a wireless manner may be directly driven by the received wireless power, or a battery may be charged by using the received wireless power, then allowing the wireless power receiver to be driven by the charged power.

The Wireless Power Consortium (WPC) which manages technologies for a magnetic inductive wireless power transfer has published a standard document "System description Wireless Power Transfer, Volume 1, Low Power, Part 1: Interface Definition, Version 1.00 Release Candidate 1 (RC1)" for interoperability in the wireless power transfer on Apr. 12, 2010.

A transmitter (a transfer device, a transmitting apparatus, etc.) may transmit power to a receiver (a receiving device, a receiving apparatus, etc.) by a one-to-one unidirectional communication method in which one transmitter and one receiver communicate with each other in one-to-one correspondence. However, when one transmitter has to communicate with a plurality of receivers, difficulty in communication may be caused in the related art method.

DISCLOSURE OF THE INVENTION

Therefore, an aspect of the detailed description is to provide a transmitter interoperable with an induction method and a resonance method in a wireless charging system, and a communication method thereof.

Another aspect of the detailed description is to provide a bidirectional communication method in a wireless charging system.

To achieve these and other advantages and in accordance with the purpose of the present invention, as embodied and broadly described herein, there is provided a wireless power transmitter including a power transmission unit, wherein the power transmission unit of the wireless power transmitter may include a first coil that is configured to generate a magnetic field for power transmission of an induction method, and a second coil that is wound around the first coil and configured to generate a magnetic field vibrating at a resonant frequency for power transmission of a resonance method.

In accordance with one embodiment disclosed herein, a Q value of the second coil may be in the range of 100 to 200.

In accordance with one embodiment disclosed herein, a ratio of an edge impedance real number part to a central impedance real number part of the second coil may be greater than 1.2. A ratio of an edge impedance imaginary number part to a central impedance imaginary number part of the second coil may be smaller than 1.

In accordance with one embodiment disclosed herein, the second coil may be formed in a flat spiral structure, and an interval of the second coil may be non-uniform. The interval of the second coil may gradually get narrow from an inner circumference toward an outer circumference of the second coil.

In accordance with one embodiment disclosed herein, the first coil may be wound into a circular shape, and the second coil may be wound into a quadrilateral shape at least part of which is linear.

In accordance with one embodiment disclosed herein, a controller of the wireless power transmitter may apply power individually to the first and second coils, and decide one of the induction method and the resonance method for power transmission, according to a response of the wireless power receiver with respect to the power applied.

In accordance with one embodiment disclosed herein, a signal transmitted from the wireless power receiver may be detected through World Power Consortium (WPC)-compliant unidirectional communication when the power is transferred according to the induction method. Communication with the wireless power receiver may be executed by a bidirectional communication method using a channel, other than a power channel, when the power is transferred according to the resonance method.

In accordance with one embodiment disclosed herein, the bidirectional communication method may include assigning by the wireless power transmitter a timeslot and provides an access ID to the wireless power receiver.

To achieve these and other advantages and in accordance with the purpose of the present invention, as embodied and broadly described herein, there is provided a wireless charging system including a transmitter that is provided with a first coil of an induction method and a second coil of a resonance method, and configured to transmit power in a wireless manner, and a receiver that is configured to receive the wireless power from the transmitter. The wireless charging system may apply power individually to the first and second coils and decide one of the induction method and the resonance method for power transmission, according to a response of the receiver to the power applied.

In accordance with one embodiment disclosed herein, the receiver may transmit a list of supportable communication protocols to the transmitter, and the transmitter may notify communication protocols supportable thereby in the received list. The list of communication protocols may be selected from a communication protocol catalog defined in World Power Consortium (WPC).

Advantageous Effect

In accordance with the detailed description, an employment of a structure in which a coil compliant with an induction method (or an induction-type coil) is surrounded by a coil compliant with a resonance method (or resonance-type coil) may result in implement of an induction/resonance-interoperable coil. By the limitation of a Q value of the coil, the interoperable coil in the structure can be normally driven.

Also, the induction/resonance-interoperable coil and a communication method thereof disclosed herein may provide a transient technology for improving the conventional induction method which has been already commercialized into the resonance method. The induction/resonance-interoperable communication method may facilitate for communication between one transmitter and a plurality of receivers.

In addition, a communication protocol-compatible wireless charging system can be implemented in a manner that a receiver transmits a list of communication protocols supportable thereby to a transmitter.

BRIEF DESCRIPTION OF THE DRAWINGS

FIGS. 14 to 18 are views illustrating the structure of packets including a power control message between the wireless power transmitter 100 and the wireless power receiver.

MODES FOR CARRYING OUT THE PREFERRED EMBODIMENTS

Figure 1:
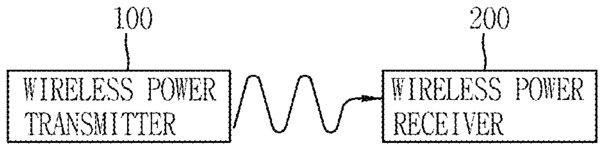
FIG. 1 is an exemplary view conceptually illustrating a wireless power transmitter and a wireless power receiver according to the embodiments of the present invention.

The technologies disclosed herein may be applicable to wireless power transfer (or wireless power transmission). However, the technologies disclosed herein are not limited to this, and may be also applicable to all kinds of power transmission systems and methods, wireless charging circuits and methods to which the technological spirit of the technology can be applicable, in addition to the methods and apparatuses using power transmitted in a wireless manner.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

In addition, a suffix "module" or "unit" used for constituent elements disclosed in the following description is merely intended for easy description of the specification, and the suffix itself does not give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

DEFINITION

Many-to-one communication: communicating between one transmitter (Tx) and many receivers (Rx)

Unidirectional communication: transmitting a required message only from a receiver to a transmitter Bidirectional communication: allowing message transmission from a transmitter to a receiver and from the receiver to the transmitter, namely, at both sides Here, the transmitter and the receiver indicate the same as a transmitting unit (device) and a receiving unit (device), respectively. Hereinafter, those terms may be used together.

Conceptual View of Wireless Power Transmitter and Wireless Power Receiver

FIG. 1 is an exemplary view conceptually illustrating a wireless power transmitter and a wireless power receiver according to the embodiments of the present invention.

Referring to FIG. 1, a wireless power transmitter 100 may be a power transfer apparatus configured to transfer power required for a wireless power receiver 200 in a wireless manner.

Furthermore, the wireless power transmitter 100 may be a wireless charging apparatus configured to charge a battery of the wireless power receiver 200 by transferring power in a wireless manner.

Additionally, the wireless power transmitter 100 may be implemented with various forms of apparatuses transferring power to the wireless power receiver 200 requiring power in a contactless state.

The wireless power receiver 200 is a device that is operable by receiving power from the wireless power transmitter 100 in a wireless manner. Furthermore, the wireless power receiver 200 may charge a battery using the received wireless power.

On the other hand, the wireless power receiver for receiving power in a wireless manner as described herein should be construed broadly to include a portable phone, a cellular phone, a smart phone, a personal digital assistant (PDA), a portable multimedia player (PMP), a tablet, a multimedia device, or the like, in addition to an input/output device such as a keyboard, a mouse, an audio-visual auxiliary device, and the like.

The wireless power receiver 200, as described later, may be a mobile communication terminal (for example, a portable phone, a cellular phone, a tablet and the like) or a multimedia device.

On the other hand, the wireless power transmitter 100 may transfer power in a wireless manner without mutual contact to the wireless power receiver 200 using one or more wireless power transfer methods. In other words, the wireless power transmitter 100 may transfer power using at least one of an inductive coupling method based on magnetic induction phenomenon by the wireless power signal and a magnetic resonance coupling method based on electromagnetic resonance phenomenon by a wireless power signal at a specific frequency.

Wireless power transfer in the inductive coupling method is a technology transferring power in a wireless manner using a primary coil and a secondary coil, and refers to the transmission of power by inducing a current from a coil to another coil through a changing magnetic field by a magnetic induction phenomenon.

Wireless power transfer in the inductive coupling method refers to a technology in which the wireless power receiver 200 generates resonance by a wireless power signal transmitted from the wireless power transmitter 100 to transfer power from the wireless power transmitter 100 to the wireless power receiver 200 by the resonance phenomenon.

Hereinafter, the wireless power transmitter 100 and wireless power receiver 200 according to the embodiments disclosed herein will be described in detail. In assigning reference numerals to the constituent elements in each of the following drawings, the same reference numerals will be used for the same constituent elements even though they are shown in a different drawing.

Figure 2:
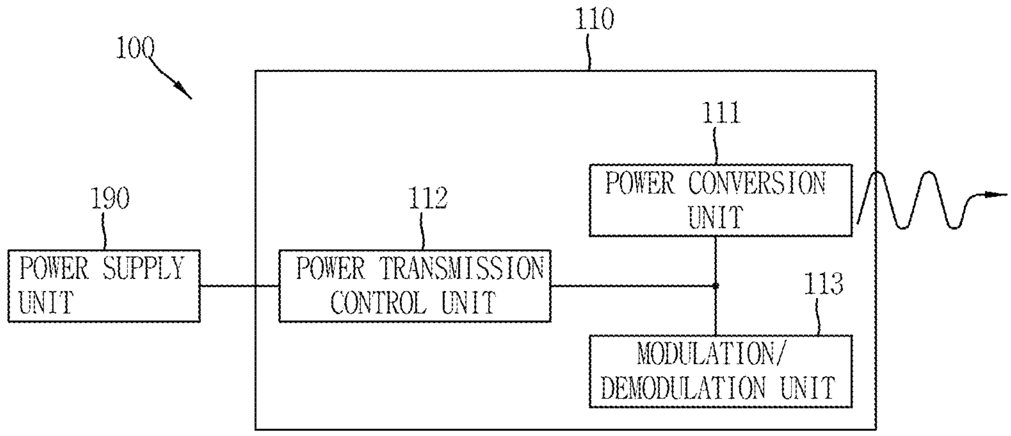
FIGS. 2A and 2B are exemplary block diagrams illustrating the configuration of a wireless power transmitter and a wireless power receiver that can be employed in the embodiments disclosed herein, respectively.
Figure 2:
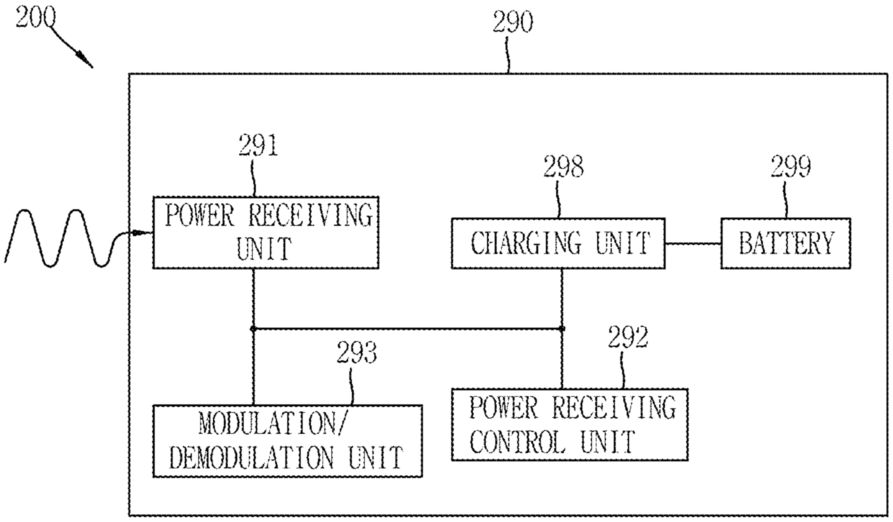

FIGS. 2A and 2B are exemplary block diagrams illustrating the configuration of a wireless power transmitter 100 and a wireless power receiver 200 that can be employed in the embodiments disclosed herein.

Wireless Power Transmitter

Referring to FIG. 2A, the wireless power transmitter 100 may include a power transmission unit 110. The power transmission unit 110 may include a power conversion unit 111 and a power transmission control unit 112.

The power conversion unit 111 transfers power supplied from a transmission side power supply unit 190 to the wireless power receiver 200 by converting it into a wireless power signal. The wireless power signal transferred by the power conversion unit 111 is generated in the form of a magnetic field or electro-magnetic field having an oscillation characteristic. For this purpose, the power conversion unit 111 may be configured to include a coil for generating the wireless power signal.

The power conversion unit 111 may include a constituent element for generating a different type of wireless power signal according to each power transfer method. For example, the power conversion unit 111 may include a primary coil for forming a changing magnetic field to induce a current to a secondary coil of the wireless power receiver 200. Furthermore, the power conversion unit 111 may include a coil (or antenna) for forming a magnetic field having a specific resonant frequency to generate a resonant frequency in the wireless power receiver 200 according to the resonance coupling method.

Furthermore, the power conversion unit 111 may transfer power using at least one of the foregoing inductive coupling method and the resonance coupling method.

Among the constituent elements included in the power conversion unit 111, those for the inductive coupling method will be described later with reference to FIGS. 4 and 5, and those for the resonance coupling method will be described with reference to FIGS. 7 and 8.

On the other hand, the power conversion unit 111 may further include a circuit for controlling the characteristics of a used frequency, an applied voltage, an applied current or the like to form the wireless power signal.

The power transmission control unit 112 controls each of the constituent elements included in the power transmission unit 110. The power transmission control unit 112 may be implemented to be integrated into another control unit (not shown) for controlling the wireless power transmitter 100.

On the other hand, a region which the wireless power signal can be approached may be divided into two types. First, an active area denotes a region through which a wireless power signal transferring power to the wireless power receiver 200 is passed. Next, a semi-active area denotes an interest region in which the wireless power transmitter 100 can detect the existence of the wireless power receiver 200. Here, the power transmission control unit 112 may detect whether the wireless power receiver 200 is placed in the active area or detection area or removed from the area. Specifically, the power transmission control unit 112 may detect whether or not the wireless power receiver 200 is placed in the active area or detection area using a wireless power signal formed from the power conversion unit 111 or a sensor separately provided therein. For instance, the power transmission control unit 112 may detect the presence of the wireless power receiver 200 by monitoring whether or not the characteristic of power for forming the wireless power signal is changed by the wireless power signal, which is affected by the wireless power receiver 200 existing in the detection area. However, the active area and detection area may vary according to the wireless power transfer method such as an inductive coupling method, a resonance coupling method, and the like.

The power transmission control unit 112 may perform the process of identifying the wireless power receiver 200 or determine whether to start wireless power transfer according to a result of detecting the existence of the wireless power receiver 200.

Furthermore, the power transmission control unit 112 may determine at least one characteristic of a frequency, a voltage, and a current of the power conversion unit 111 for forming the wireless power signal. The determination of the characteristic may be carried out by a condition at the side of the wireless power transmitter 100 or a condition at the side of the wireless power receiver 200.

The power transmission control unit 112 may receive a power control message from the wireless power receiver 200. The power transmission control unit 112 may determine at least one characteristic of a frequency, a voltage and a current of the power conversion unit 111 based on the received power control message, and additionally perform other control operations based on the power control message.

For example, the power transmission control unit 112 may determine at least one characteristic of a frequency, a voltage and a current used to form the wireless power signal according to the power control message including at least one of rectified power amount information, charging state information and identification information in the wireless power receiver 200.

Furthermore, as another control operation using the power control message, the wireless power transmitter 100 may perform a typical control operation associated with wireless power transfer based on the power control message. For example, the wireless power transmitter 100 may receive information associated with the wireless power receiver 200 to be auditorily or visually outputted through the power control message, or receive information required for authentication between devices.

In exemplary embodiments, the power transmission control unit 112 may receive the power control message through the wireless power signal. In other exemplary embodiment, the power transmission control unit 112 may receive the power control message through a method for receiving user data.

In order to receive the foregoing power control message, the wireless power transmitter 100 may further include a modulation/demodulation unit 113 electrically connected to the power conversion unit 111. The modulation/demodulation unit 113 may demodulate a wireless power signal that has been modulated by the wireless power receiver 200 and use it to receive the power control message.

In addition, the power transmission control unit 112 may acquire a power control message by receiving user data including the power control message by a communication means (not shown) included in the wireless power transmitter 100.

[For Supporting in-Band Two-Way Communication]

Under a wireless power transfer environment allowing for bi-directional communications according to the exemplary embodiments disclosed herein, the power transmission control unit 112 may transmit data to the wireless power receiver 200. The data transmitted by the power transmission control unit 112 may be transmitted to request the wireless power receiver 200 to send the power control message.

Wireless Power Receiver

Referring to FIG. 2B, the wireless power receiver 200 may include a power supply unit 290. The power supply unit 290 supplies power required for the operation of the wireless power receiver 200. The power supply unit 290 may include a power receiving unit 291 and a power reception control unit 292.

The power receiving unit 291 receives power transferred from the wireless power transmitter 100 in a wireless manner.

The power receiving unit 291 may include constituent elements required to receive the wireless power signal according to a wireless power transfer method. Furthermore, the power receiving unit 291 may receive power according to at least one wireless power transfer method, and in this case, the power receiving unit 291 may include constituent elements required for each method.

First, the power receiving unit 291 may include a coil for receiving a wireless power signal transferred in the form of a magnetic field or electromagnetic field having a vibration characteristic.

For instance, as a constituent element according to the inductive coupling method, the power receiving unit 291 may include a secondary coil to which a current is induced by a changing magnetic field. In exemplary embodiments, the power receiving unit 291, as a constituent element according to the resonance coupling method, may include a coil and a resonant circuit in which resonance phenomenon is generated by a magnetic field having a specific resonant frequency.

In another exemplary embodiments, when the power receiving unit 291 receives power according to at least one wireless power transfer method, the power receiving unit 291 may be implemented to receive power by using a coil, or implemented to receive power by using a coil formed differently according to each power transfer method.

Among the constituent elements included in the power receiving unit 291, those for the inductive coupling method will be described later with reference to FIG. 4, and those for the resonance coupling method with reference to FIG. 7.

On the other hand, the power receiving unit 291 may further include a rectifier and a regulator to convert the wireless power signal into a direct current. Furthermore, the power receiving unit 291 may further include a circuit for protecting an overvoltage or overcurrent from being generated by the received power signal.

The power reception control unit 292 may control each constituent element included in the power supply unit 290.

Specifically, the power reception control unit 292 may transfer a power control message to the wireless power transmitter 100. The power control message may instruct the wireless power transmitter 100 to initiate or terminate a transfer of the wireless power signal. Furthermore, the power control message may instruct the wireless power transmitter 100 to control a characteristic of the wireless power signal.

In exemplary embodiments, the power reception control unit 292 may transmit the power control message through at least one of the wireless power signal and user data.

In order to transmit the foregoing power control message, the wireless power receiver 200 may further include a modulation/demodulation unit 293 electrically connected to the power receiving unit 291. The modulation/demodulation unit 293, similarly to the case of the wireless power transmitter 100, may be used to transmit the power control message through the wireless power signal. The power communications modulation/demodulation unit 293 may be used as a means for controlling a current and/or voltage flowing through the power conversion unit 111 of the wireless power transmitter 100. Hereinafter, a method for allowing the power communications modulation/demodulation unit 113 or 293 at the side of the wireless power transmitter 100 and at the side of the wireless power receiver 200, respectively, to be used to transmit and receive a power control message through a wireless power signal will be described.

A wireless power signal formed by the power conversion unit 111 is received by the power receiving unit 291. At this time, the power reception control unit 292 controls the power communications modulation/demodulation unit 293 at the side of the wireless power receiver 200 to modulate the wireless power signal. For instance, the power reception control unit 292 may perform a modulation process such that a power amount received from the wireless power signal is varied by changing a reactance of the power communications modulation/demodulation unit 293 connected to the power receiving unit 291. The change of a power amount received from the wireless power signal results in the change of a current and/or voltage of the power conversion unit 111 for forming the wireless power signal. At this time, the modulation/demodulation unit 113 at the side of the wireless power transmitter 100 may detect a change of the current and/or voltage to perform a demodulation process.

In other words, the power reception control unit 292 may generate a packet including a power control message intended to be transferred to the wireless power transmitter 100 and modulate the wireless power signal to allow the packet to be included therein, and the power transmission control unit 112 may decode the packet based on a result of performing the demodulation process of the power communications modulation/demodulation unit 113 to acquire the power control message included in the packet.

In addition, the power reception control unit 292 may transmit a power control message to the wireless power transmitter 100 by transmitting user data including the power control message by a communication means (not shown) included in the wireless power receiver 200.

[For Supporting in-Band Two-Way Communication]

Under a wireless power transfer environment allowing for bi-directional communications according to the exemplary embodiments disclosed herein, the power reception control unit 292 may receive data to the wireless power transmitter 100. The data transmitted by the wireless power transmitter 100 may be transmitted to request the wireless power receiver 200 to send the power control message.

In addition, the power supply unit 290 may further include a charger 298 and a battery 299.

The wireless power receiver 200 receiving power for operation from the power supply unit 290 may be operated by power transferred from the wireless power transmitter 100, or operated by charging the battery 299 using the transferred power and then receiving the charged power. At this time, the power reception control unit 292 may control the charger 298 to perform charging using the transferred power.

Hereinafter, description will be given of a wireless power transmitter and a wireless power receiver applicable to the exemplary embodiments disclosed herein. First, a method of allowing the wireless power transmitter to transfer power to the electronic device according to the inductive coupling method will be described with reference to FIGS. 3 through 5.

Inductive Coupling Method

Figure 3:
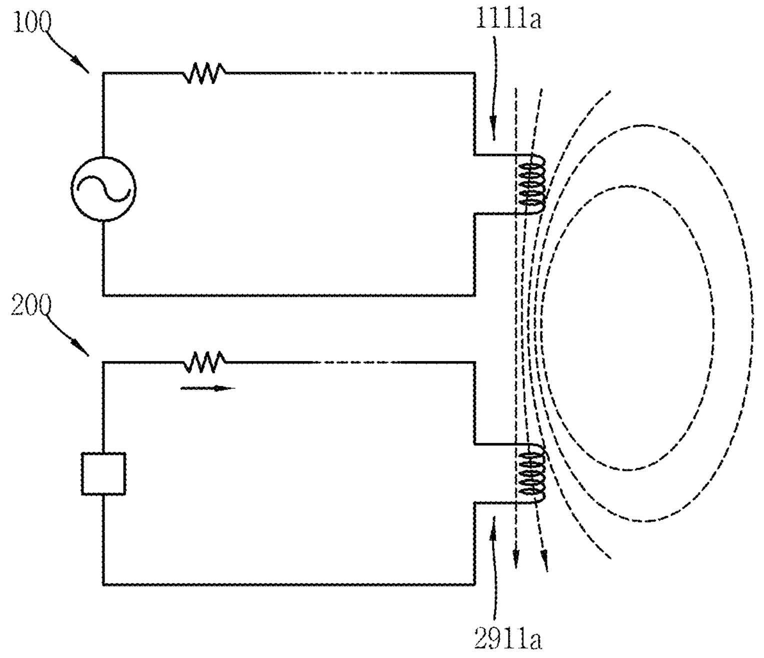
FIG. 3 is a view illustrating a concept in which power is transferred from a wireless power transmitter to a wireless power receiver in a wireless manner according to an inductive coupling method.

FIG. 3 is a view illustrating a concept in which power is transferred from a wireless power transmitter to an electronic device in a wireless manner according to an inductive coupling method.

When the power of the wireless power transmitter 100 is transferred in an inductive coupling method, if the strength of a current flowing through a primary coil within the power transmission unit 110 is changed, then a magnetic field passing through the primary coil will be changed by the current. The changed magnetic field generates an induced electromotive force at a secondary coil in the wireless power receiver 200.

According to the foregoing method, the power conversion unit 111 of the wireless power transmitter 100 may include a transmitting (Tx) coil 1111*a* being operated as a primary coil in magnetic induction. Furthermore, the power receiving unit 291 of the wireless power receiver 200 may include a receiving (Rx) coil 2911*a* being operated as a secondary coil in magnetic induction.

First, the wireless power transmitter 100 and wireless power receiver 200 are disposed in such a manner that the transmitting coil 1111*a* at the side of the wireless power transmitter 100 and the receiving coil at the side of the wireless power receiver 200 are located adjacent to each other. Then, if the power transmission control unit 112 controls a current of the transmitting coil (Tx coil) 1111*a* to be changed, then the power receiving unit 291 controls power to be supplied to the wireless power receiver 200 using an electromotive force induced to the receiving coil (Rx coil) 2911*a*.

The efficiency of wireless power transfer by the inductive coupling method may be little affected by a frequency characteristic, but affected by an alignment and distance between the wireless power transmitter 100 and the wireless power receiver 200 including each coil.

On the other hand, in order to perform wireless power transfer in the inductive coupling method, the wireless power transmitter 100 may be configured to include an interface surface (not shown) in the form of a flat surface. One or more electronic devices may be placed at an upper portion of the interface surface, and the transmitting coil 1111*a* may be mounted at a lower portion of the interface surface. In this case, a vertical spacing is formed in a small-scale between the transmitting coil 1111*a* mounted at a lower portion of the interface surface and the receiving coil 2911*a* of the wireless power receiver 200 placed at an upper portion of the interface surface, and thus a distance between the coils becomes sufficiently small to efficiently implement contactless power transfer by the inductive coupling method.

Furthermore, an alignment indicator (not shown) indicating a location where the wireless power receiver 200 is to be placed at an upper portion of the interface surface. The alignment indicator indicates a location of the wireless power receiver 200 where an alignment between the transmitting coil 1111*a* mounted at a lower portion of the interface surface and the receiving coil 2911*a* can be suitably implemented. The alignment indicator may alternatively be simple marks, or may be formed in the form of a protrusion structure for guiding the location of the wireless power receiver 200. Otherwise, the alignment indicator may be formed in the form of a magnetic body such as a magnet mounted at a lower portion of the interface surface, thereby guiding the coils to be suitably arranged by mutual magnetism to a magnetic body having an opposite polarity mounted within the wireless power receiver 200.

On the other hand, the wireless power transmitter 100 may be formed to include one or more transmitting coils. The wireless power transmitter 100 may selectively use some of coils suitably arranged with the receiving coil 2911*a* of the wireless power receiver 200 among the one or more transmitting coils to enhance the power transmission efficiency. The wireless power transmitter 100 including the one or more transmitting coils will be described later with reference to FIG. 5.

Hereinafter, configurations of the wireless power transmitter and electronic device using an inductive coupling method applicable to the embodiments disclosed herein will be described in detail.

Wireless Power Transmitter and Electronic Device in Inductive Coupling Method

Figure 4A:
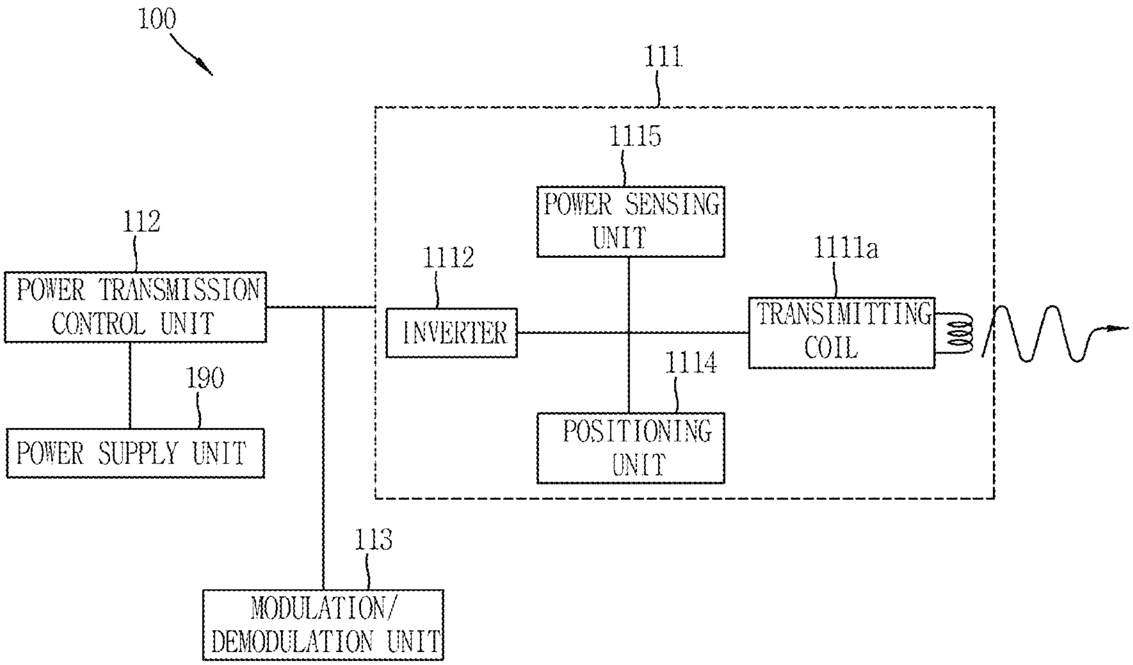
FIGS. 4A and 4B are block diagrams illustrating part of the wireless power transmitter and wireless power receiver in a magnetic induction method that can be employed in the embodiments disclosed herein.
Figure 4B:
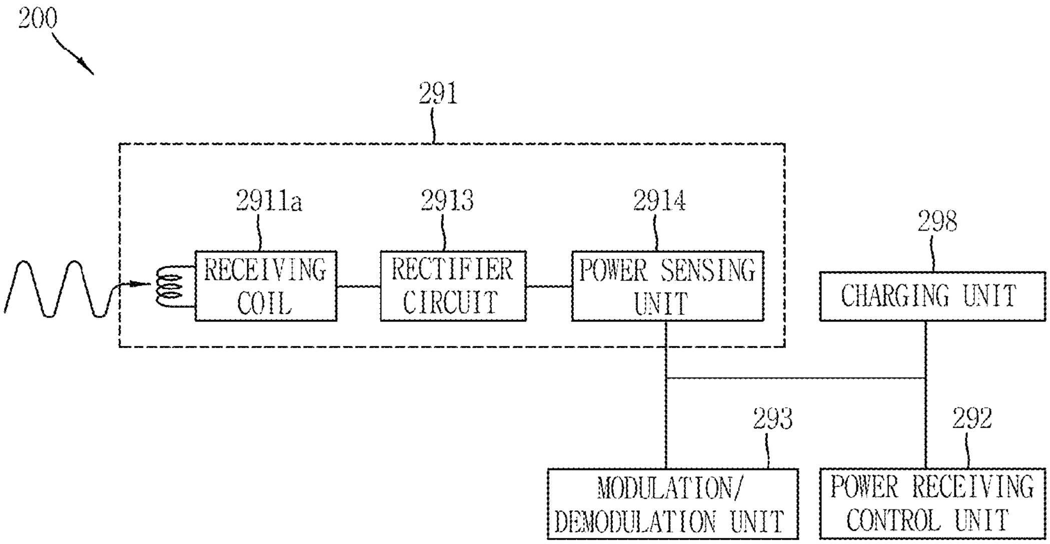

FIG. 4 is a block diagram illustrating part of the wireless power transmitter 100 and wireless power receiver 200 in a magnetic induction method that can be employed in the embodiments disclosed herein. A configuration of the power transmission unit 110 included in the wireless power transmitter 100 will be described with reference to FIG. 4A, and a configuration of the power supply unit 290 included in the wireless power receiver 200 will be described with reference to FIG. 4B.

Referring to FIG. 4A, the power conversion unit 111 of the wireless power transmitter 100 may include a transmitting (Tx) coil 1111*a* and an inverter 1112.

The transmitting coil 1111*a* may form a magnetic field corresponding to the wireless power signal according to a change of current as described above. The transmitting coil 1111*a* may alternatively be implemented with a planar spiral type or cylindrical solenoid type.

The inverter 1112 transforms a DC input obtained from the power supply unit 190 into an AC waveform. The AC current transformed by the inverter 1112 drives a resonant circuit including the transmitting coil 1111*a* and a capacitor (not shown) to form a magnetic field in the transmitting coil 1111*a*.

In addition, the power conversion unit 111 may further include a positioning unit 1114.

The positioning unit 1114 may move or rotate the transmitting coil 1111*a* to enhance the effectiveness of contactless power transfer using the inductive coupling method. As described above, it is because an alignment and distance between the wireless power transmitter 100 and the wireless power receiver 200 including a primary coil and a secondary coil may affect power transfer using the inductive coupling method. In particular, the positioning unit 1114 may be used when the wireless power receiver 200 does not exist within an active area of the wireless power transmitter 100.

Accordingly, the positioning unit 1114 may include a drive unit (not shown) for moving the transmitting coil 1111*a* such that a center-to-center distance of the transmitting coil 1111*a* of the wireless power transmitter 100 and the receiving coil 2911*a* of the wireless power receiver 200 is within a predetermined range, or rotating the transmitting coil 1111*a* such that the centers of the transmitting coil 1111*a* and the receiving coil 2911*a* are overlapped with each other.

For this purpose, the wireless power transmitter 100 may further include a detection unit (not shown) made of a sensor for detecting the location of the wireless power receiver 200, and the power transmission control unit 112 may control the positioning unit 1114 based on the location information of the wireless power receiver 200 received from the location detection sensor.

Furthermore, to this end, the power transmission control unit 112 may receive control information on an alignment or distance to the wireless power receiver 200 through the power communications modulation/demodulation unit 113, and control the positioning unit 1114 based on the received control information on the alignment or distance.

If the power conversion unit 111 is configured to include a plurality of transmitting coils, then the positioning unit 1114 may determine which one of the plurality of transmitting coils is to be used for power transmission. The configuration of the wireless power transmitter 100 including the plurality of transmitting coils will be described later with reference to FIG. 5.

On the other hand, the power conversion unit 111 may further include a power sensing unit 1115. The power sensing unit 1115 at the side of the wireless power transmitter 100 monitors a current or voltage flowing into the transmitting coil 1111*a*. The power sensing unit 1115 is provided to check whether or not the wireless power transmitter 100 is normally operated, and thus the power sensing unit 1115 may detect a voltage or current of the power supplied from the outside, and check whether the detected voltage or current exceeds a threshold value. The power sensing unit 1115, although not shown, may include a resistor for detecting a voltage or current of the power supplied from the outside and a comparator for comparing a voltage value or current value of the detected power with a threshold value to output the comparison result. Based on the check result of the power sensing unit 1115, the power transmission control unit 112 may control a switching unit (not shown) to cut off power applied to the transmitting coil 1111*a*.

Referring to FIG. 4B, the power supply unit 290 of the wireless power receiver 200 may include a receiving (Rx) coil 2911*a* and a rectifier 2913.

A current is induced into the receiving coil 2911*a* by a change of the magnetic field formed in the transmitting coil 1111*a*. The implementation type of the receiving coil 2911*a* may be a planar spiral type or cylindrical solenoid type similarly to the transmitting coil 1111*a*.

Furthermore, series and parallel capacitors may be configured to be connected to the receiving coil 2911*a* to enhance the effectiveness of wireless power reception or perform resonant detection.

The receiving coil 2911*a* may be in the form of a single coil or a plurality of coils.

The rectifier 2913 performs a full-wave rectification to a current to convert alternating current into direct current. The rectifier 2913, for instance, may be implemented with a full-bridge rectifier made of four diodes or a circuit using active components.

In addition, the rectifier 2913 may further include a regulator for converting a rectified current into a more flat and stable direct current. Furthermore, the output power of the rectifier 2913 is supplied to each constituent element of the power supply unit 290. Furthermore, the rectifier 2913 may further include a DC-DC converter for converting output DC power into a suitable voltage to adjust it to the power required for each constituent element (for instance, a circuit such as a charger 298).

The power communications modulation/demodulation unit 293 may be connected to the power receiving unit 291, and may be configured with a resistive element in which resistance varies with respect to direct current, and may be configured with a capacitive element in which reactance varies with respect to alternating current. The power reception control unit 292 may change the resistance or reactance of the power communications modulation/demodulation unit 293 to modulate a wireless power signal received to the power receiving unit 291.

On the other hand, the power supply unit 290 may further include a power sensing unit 2914. The power sensing unit 2914 at the side of the wireless power receiver 200 monitors a voltage and/or current of the power rectified by the rectifier 2913, and if the voltage and/or current of the rectified power exceeds a threshold value as a result of monitoring, then the power reception control unit 292 transmits a power control message to the wireless power transmitter 100 to transfer suitable power.

Wireless Power Transmitter Configured to Include One or More Transmitting Coils

Figure 5:
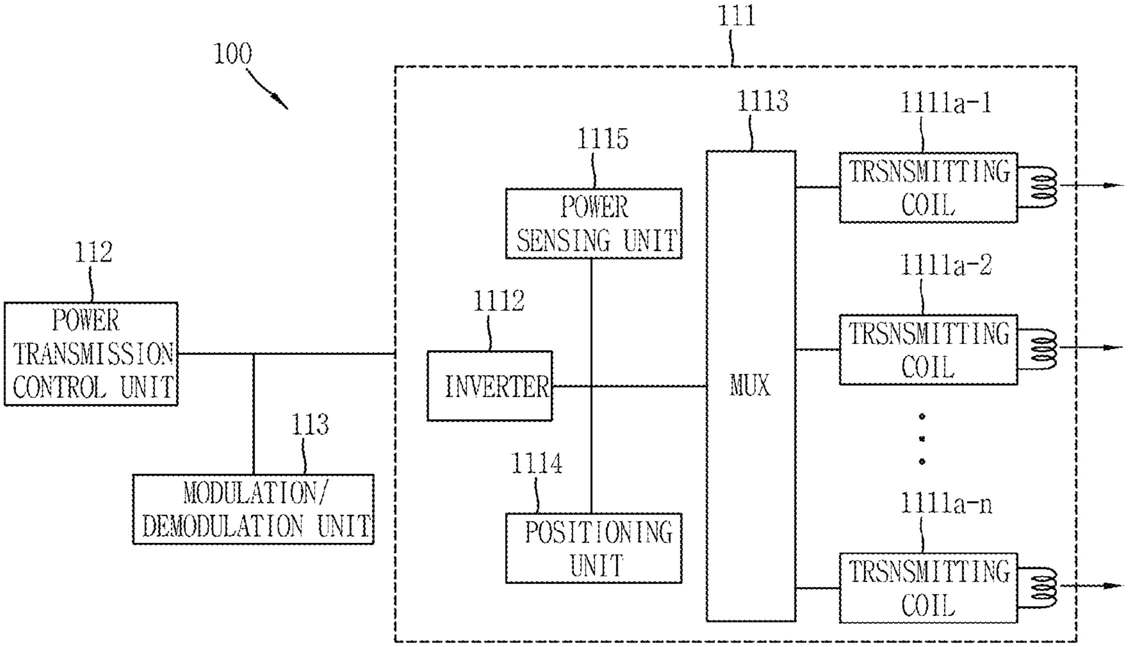
FIG. 5 is a block diagram illustrating a wireless power transmitter configured to have one or more transmitting coils receiving power according to an inductive coupling method that can be employed in the embodiments disclosed herein.

FIG. 5 is a block diagram illustrating a wireless power transmitter configured to have one or more transmission coils receiving power according to an inductive coupling method that can be employed in the embodiments disclosed herein.

Referring to FIG. 5, the power conversion unit 111 of the wireless power transmitter 100 according to the embodiments disclosed herein may include one or more transmitting coils 1111*a*-1 to 1111*a*-*n*. The one or more transmitting coils 1111*a*-1 to 1111*a*-*n* may be an array of partly overlapping primary coils. An active area may be determined by some of the one or more transmitting coils.

The one or more transmitting coils 1111*a*-1 to 1111*a*-*n* may be mounted at a lower portion of the interface surface. Furthermore, the power conversion unit 111 may further include a multiplexer 1113 for establishing and releasing the connection of some of the one or more transmitting coils 1111*a*-1 to 1111*a*-*n*.

Upon detecting the location of the wireless power receiver 200 placed at an upper portion of the interface surface, the power transmission control unit 112 may take the detected location of the wireless power receiver 200 into consideration to control the multiplexer 1113, thereby allowing coils that can be placed in an inductive coupling relation to the receiving coil 2911*a* of the wireless power receiver 200 among the one or more transmitting coils 1111*a*-1 to 1111*a*-*n* to be connected to one another.

For this purpose, the power transmission control unit 112 may acquire the location information of the wireless power receiver 200. For example, the power transmission control unit 112 may acquire the location of the wireless power receiver 200 on the interface surface by the location detection unit (not shown) provided in the wireless power transmitter 100. For another example, the power transmission control unit 112 may alternatively receive a power control message indicating a strength of the wireless power signal from an object on the interface surface or a power control message indicating the identification information of the object using the one or more transmitting coils 1111*a*-1 to 1111*a*-*n*, respectively, and determines whether it is located adjacent to which one of the one or more transmitting coils based on the received result, thereby acquiring the location information of the wireless power receiver 200.

On the other hand, the active area as part of the interface surface may denote a portion through which a magnetic field with a high efficiency can pass when the wireless power transmitter 100 transfers power to the wireless power receiver 200 in a wireless manner. At this time, a single transmitting coil or a combination of one or more transmitting coils forming a magnetic field passing through the active area may be designated as a primary cell. Accordingly, the power transmission control unit 112 may determine an active area based on the detected location of the wireless power receiver 200, and establish the connection of a primary cell corresponding to the active area to control the multiplexer 1113, thereby allowing the receiving coil 2911*a* of the wireless power receiver 200 and the coils belonging to the primary cell to be placed in an inductive coupling relation.

Furthermore, the power conversion unit 111 may further include an impedance matching unit (not shown) for controlling an impedance to form a resonant circuit with the coils connected thereto.

Hereinafter, a method for allowing a wireless power transmitter to transfer power according to a resonance coupling method will be disclosed with reference to FIGS. 6 through 8.

Resonance Coupling Method

Figure 6:
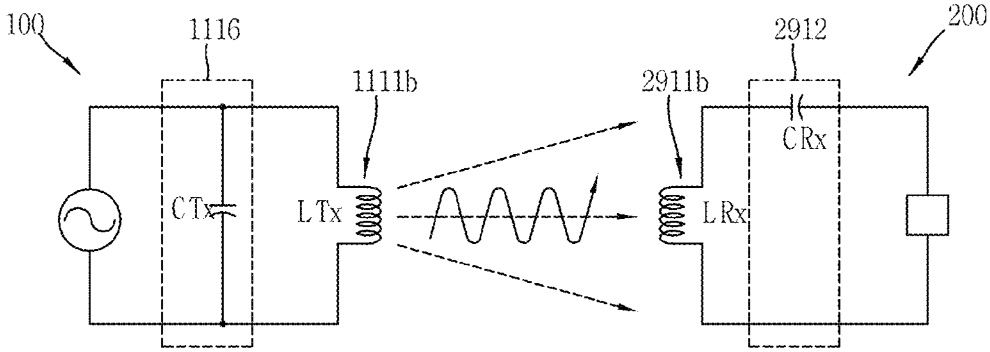
FIG. 6 is a view illustrating a concept in which power is transferred to a wireless power receiver from a wireless power transmitter in a wireless manner according to a resonance coupling method.

FIG. 6 is a view illustrating a concept in which power is transferred to an electronic device from a wireless power transmitter in a wireless manner according to a resonance coupling method.

First, resonance will be described in brief as follows. Resonance refers to a phenomenon in which amplitude of vibration is remarkably increased when periodically receiving an external force having the same frequency as the natural frequency of a vibration system. Resonance is a phenomenon occurring at all kinds of vibrations such as mechanical vibration, electric vibration, and the like. Generally, when exerting a vibratory force to a vibration system from the outside, if the natural frequency thereof is the same as a frequency of the externally applied force, then the vibration becomes strong, thus increasing the width.

With the same principle, when a plurality of vibrating bodies separated from one another within a predetermined distance vibrate at the same frequency, the plurality of vibrating bodies resonate with one another, and in this case, resulting in a reduced resistance between the plurality of vibrating bodies. In an electrical circuit, a resonant circuit can be made by using an inductor and a capacitor.

When the wireless power transmitter 100 transfers power according to the inductive coupling method, a magnetic field having a specific vibration frequency is formed by alternating current power in the power transmission unit 110. If a resonance phenomenon occurs in the wireless power receiver 200 by the formed magnetic field, then power is generated by the resonance phenomenon in the wireless power receiver 200.

The resonant frequency may be determined by the following formula in Equation 1.

$$f = \frac{1}{2\pi\sqrt{LC}} \quad \text{[Equation 1]}$$

Here, the resonant frequency (f) is determined by an inductance (L) and a capacitance (C) in a circuit. In a circuit forming a magnetic field using a coil, the inductance can be determined by a number of turns of the coil, and the like, and the capacitance can be determined by a gap between the coils, an area, and the like. In addition to the coil, a capacitive resonant circuit may be configured to be connected thereto to determine the resonant frequency.

Referring to FIG. 6, when power is transmitted in a wireless manner according to the resonance coupling method, the power conversion unit 111 of the wireless power transmitter 100 may include a transmitting (Tx) coil 1111*b* in which a magnetic field is formed and a resonant circuit 1116 connected to the transmitting coil 1111*b* to determine a specific vibration frequency. The resonant circuit 1116 may be implemented by using a capacitive circuit (capacitors), and the specific vibration frequency may be determined based on an inductance of the transmitting coil 1111*b* and a capacitance of the resonant circuit 1116.

The configuration of a circuit element of the resonant circuit 1116 may be implemented in various forms such that the power conversion unit 111 forms a magnetic field, and is not limited to a form of being connected in parallel to the transmitting coil 1111*b* as illustrated in FIG. 6.

Furthermore, the power receiving unit 291 of the wireless power receiver 200 may include a resonant circuit 2912 and a receiving (Rx) coil 2911*b* to generate a resonance phenomenon by a magnetic field formed in the wireless power transmitter 100. In other words, the resonant circuit 2912 may be also implemented by using a capacitive circuit, and the resonant circuit 2912 is configured such that a resonant frequency determined based on an inductance of the receiving coil 2911*b* and a capacitance of the resonant circuit 2912 has the same frequency as a resonant frequency of the formed magnetic field.

The configuration of a circuit element of the resonant circuit 2912 may be implemented in various forms such that the power receiving unit 291 generates resonance by a magnetic field, and is not limited to a form of being connected in series to the receiving coil 2911*b* as illustrated in FIG. 6.

The specific vibration frequency in the wireless power transmitter 100 may have LTX, CTX, and may be acquired by using the Equation 1. Here, the wireless power receiver 200 generates resonance when a result of substituting the LRX and CRX of the wireless power receiver 200 to the Equation 1 is same as the specific vibration frequency.

According to a contactless power transfer method by resonance coupling, when the wireless power transmitter 100 and wireless power receiver 200 resonate at the same frequency, respectively, an electromagnetic wave is propagated through a short-range magnetic field, and thus there exists no energy transfer between the devices if they have different frequencies.

As a result, an efficiency of contactless power transfer by the resonance coupling method is greatly affected by a frequency characteristic, whereas the effect of an alignment and distance between the wireless power transmitter 100 and the wireless power receiver 200 including each coil is relatively smaller than the inductive coupling method.

Hereinafter, the configuration of a wireless power transmitter and an electronic device in the resonance coupling method applicable to the embodiments disclosed herein will be described in detail.

Wireless Power Transmitter in Resonance Coupling Method

FIG. 7 is a block diagram illustrating part of the wireless power transmitter 100 and wireless power receiver 200 in a resonance method that can be employed in the embodiments disclosed herein.

Figure 7A:
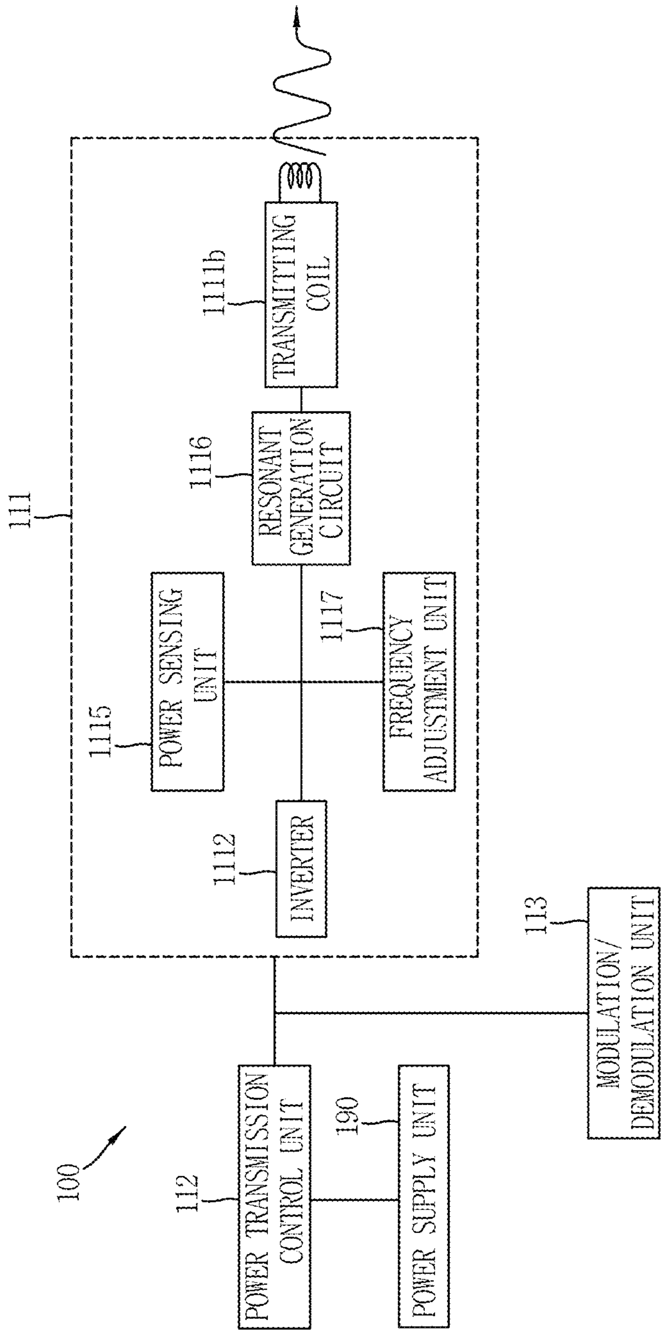
FIGS. 7A and 7B are block diagrams illustrating part of the wireless power transmitter and wireless power receiver in a resonance method that can be employed in the embodiments disclosed herein.

A configuration of the power transmission unit 110 included in the wireless power transmitter 100 will be described with reference to FIG. 7A.

The power conversion unit 111 of the wireless power transmitter 100 may include a transmitting (Tx) coil 1111*b*, an inverter 1112, and a resonant circuit 1116. The inverter 1112 may be configured to be connected to the transmitting coil 1111*b* and the resonant circuit 1116.

The transmitting coil 1111*b* may be mounted separately from the transmitting coil 1111*a* for transferring power according to the inductive coupling method, but may transfer power in the inductive coupling method and resonance coupling method using one single coil.

The transmitting coil 1111*b*, as described above, forms a magnetic field for transferring power. The transmitting coil 1111*b* and the resonant circuit 1116 generate resonance when alternating current power is applied thereto, and at this time, a vibration frequency may be determined based on an inductance of the transmitting coil 1111*b* and a capacitance of the resonant circuit 1116.

For this purpose, the inverter 1112 transforms a DC input obtained from the power supply unit 190 into an AC waveform, and the transformed AC current is applied to the transmitting coil 1111*b* and the resonant circuit 1116.

In addition, the power conversion unit 111 may further include a frequency adjustment unit 1117 for changing a resonant frequency of the power conversion unit 111. The resonant frequency of the power conversion unit 111 is determined based on an inductance and/or capacitance within a circuit constituting the power conversion unit 111 by Equation 1, and thus the power transmission control unit 112 may determine the resonant frequency of the power conversion unit 111 by controlling the frequency adjustment unit 1117 to change the inductance and/or capacitance.

The frequency adjustment unit 1117, for example, may be configured to include a motor for adjusting a distance between capacitors included in the resonant circuit 1116 to change a capacitance, or include a motor for adjusting a number of turns or diameter of the transmitting coil 1111*b* to change an inductance, or include active elements for determining the capacitance and/or inductance On the other hand, the power conversion unit 111 may further include a power sensing unit 1115. The operation of the power sensing unit 1115 is the same as the foregoing description.

Figure 7B:
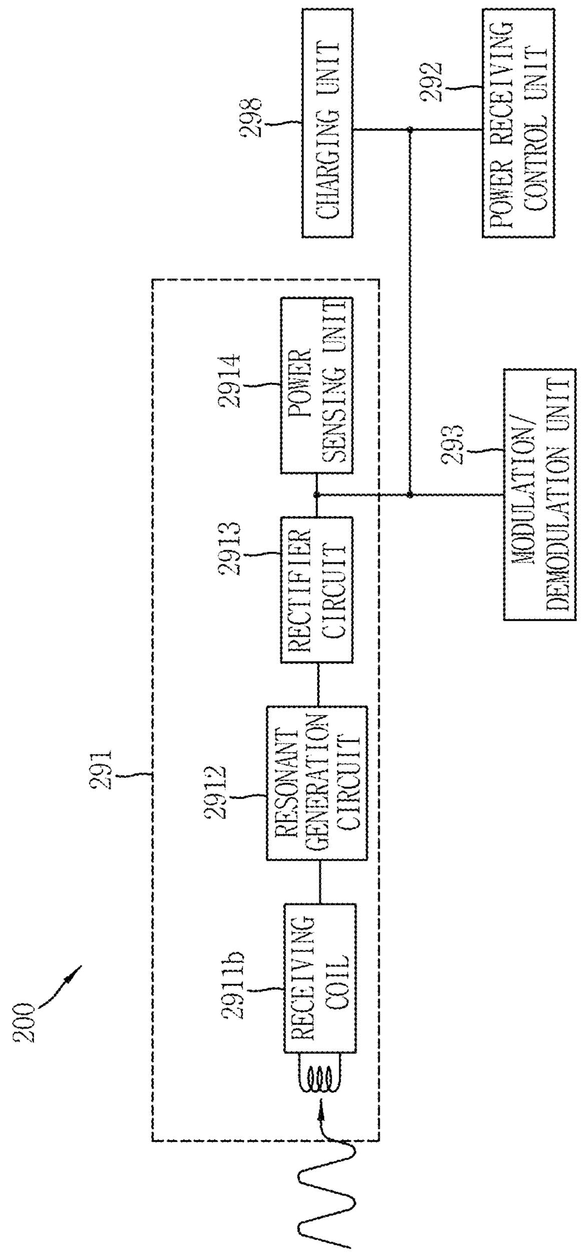

Referring to FIG. 7B, a configuration of the power supply unit 290 included in the wireless power receiver 200 will be described. The power supply unit 290, as described above, may include the receiving (Rx) coil 2911*b* and resonant circuit 2912.

In addition, the power receiving unit 291 of the power supply unit 290 may further include a rectifier 2913 for converting an AC current generated by resonance phenomenon into DC. The rectifier 2913 may be configured similarly to the foregoing description.

Furthermore, the power receiving unit 291 may further include a power sensing unit 2914 for monitoring a voltage and/or current of the rectified power. The power sensing unit 2914 may be configured similarly to the foregoing description.

Wireless Power Transmitter Configured to Include One or More Transmitting Coils

Figure 8:
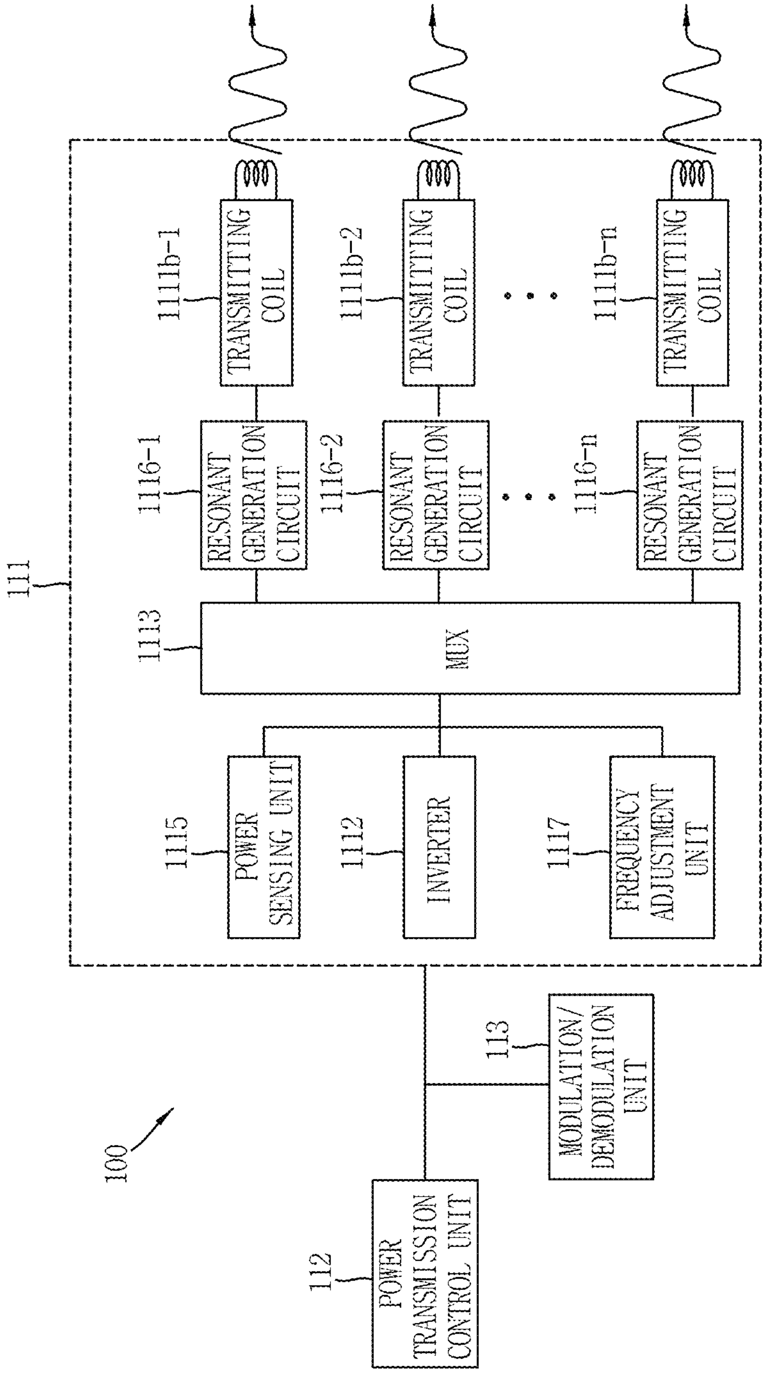
FIG. 8 is a block diagram illustrating a wireless power transmitter configured to have one or more transmitting coils receiving power according to a resonance coupling method that can be employed in the embodiments disclosed herein.

FIG. 8 is a block diagram illustrating a wireless power transmitter configured to have one or more transmission coils receiving power according to a resonance coupling method that can be employed in the embodiments disclosed herein.

Referring to FIG. 8, the power conversion unit 111 of the wireless power transmitter 100 according to the embodiments disclosed herein may include one or more transmitting coils 1111*b*-1 to 1111*b-n* and resonant circuits (1116-1 to 1116-*n*) connected to each transmitting coils. Furthermore, the power conversion unit 111 may further include a multiplexer 1113 for establishing and releasing the connection of some of the one or more transmitting coils 1111*b*-1 to 1111*b-n*.

The one or more transmitting coils 1111*b*-1 to 1111*b-n* may be configured to have the same vibration frequency, or some of them may be configured to have different vibration frequencies. It is determined by an inductance and/or capacitance of the resonant circuits (1116-1 to 1116-*n*) connected to the one or more transmitting coils 1111*b*-1 to 1111*b-n*, respectively.

For this purpose, the frequency adjustment unit 1117 may be configured to change an inductance and/or capacitance of the resonant circuits (1116-1 to 1116-*n*) connected to the one or more transmitting coils 1111*b*-1 to 1111*b-n*, respectively.

In-Band Communication

Figure 9:
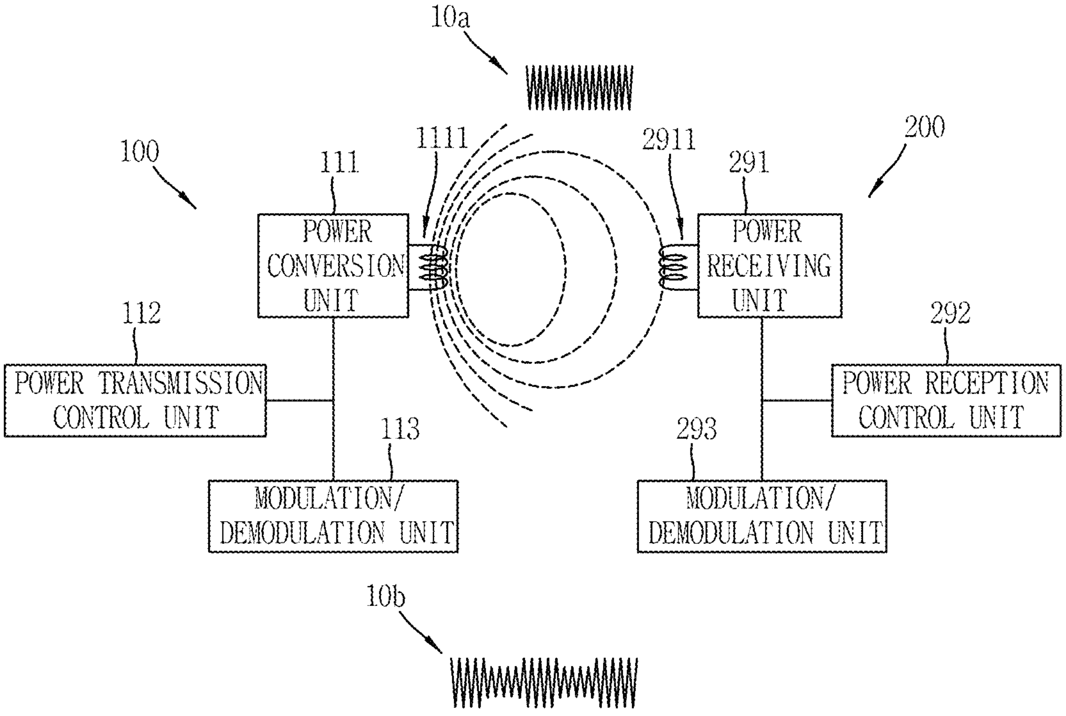
FIG. 9 is a view illustrating a concept of transmitting and receiving a packet between a wireless power transmitter and an electronic device through the modulation and demodulation of a wireless power signal in transferring power in a wireless manner disclosed herein.

FIG. 9 a view illustrating the concept of transmitting and receiving a packet between a wireless power transmitter and a wireless power receiver through the modulation and demodulation of a wireless power signal in transferring power in a wireless manner disclosed herein.

As illustrated in FIG. 9, the power conversion unit 111 included in the wireless power transmitter 100 may generate a wireless power signal. The wireless power signal may be generated through the transmitting coil 1111 included in the power conversion unit 111.

The wireless power signal 10*a* generated by the power conversion unit 111 may arrive at the wireless power receiver 200 so as to be received through the power receiving unit 291 of the wireless power receiver 200. The generated wireless power signal may be received through the receiving coil 2911 included in the power receiving unit 291.

The power reception control unit 292 may control the modulation/demodulation unit 293 connected to the power receiving unit 291 to modulate the wireless power signal while the wireless power receiver 200 receives the wireless power signal. When the received wireless power signal is modulated, the wireless power signal may form a closed-loop within a magnetic field or an electro-magnetic field. This may allow the wireless power transmitter 100 to sense a modulated wireless power signal 10*b*. The modulation/demodulation unit 113 may demodulate the sensed wireless power signal and decode the packet from the demodulated wireless power signal.

The modulation method employed for the communication between the wireless power transmitter 100 and the wireless power receiver 200 may be an amplitude modulation. As aforementioned, the amplitude modulation is a backscatter modulation may be a backscatter modulation method in which the power communications modulation/demodulation unit 293 at the side of the wireless power receiver 200 changes an amplitude of the wireless power signal 10*a* formed by the power conversion unit 111 and the power reception control unit 292 at the side of the wireless power transmitter 100 detects an amplitude of the modulated wireless power signal 10*b*.

Modulation and Demodulation of Wireless Power Signal

Hereinafter, description will be given of modulation and demodulation of a packet, which is transmitted or received between the wireless power transmitter 100 and the wireless power receiver 200 with reference to FIGS. 10 and 11.

Figure 10:
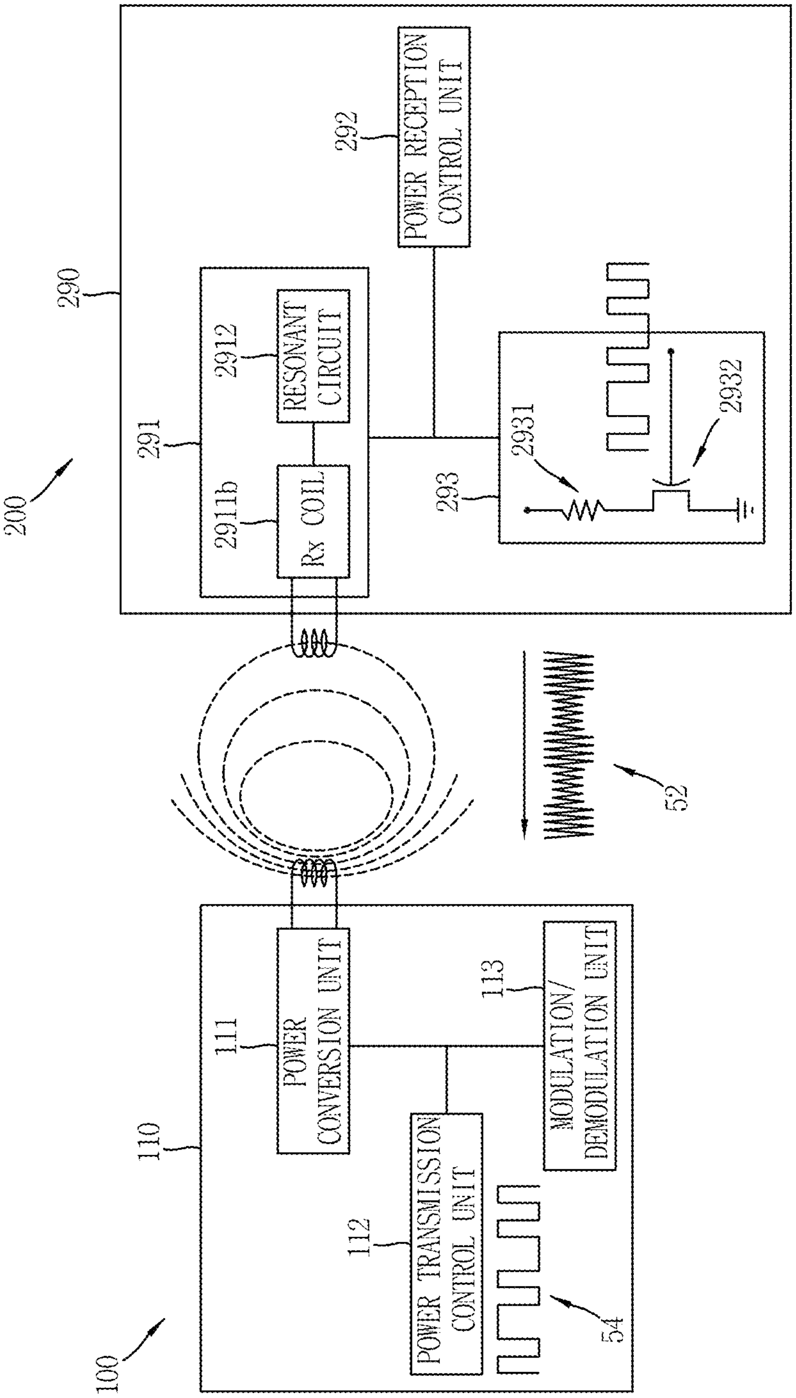
FIG. 10 is a view illustrating a configuration of transmitting and receiving a power control message in transferring power in a wireless manner disclosed herein.
Figure 11:
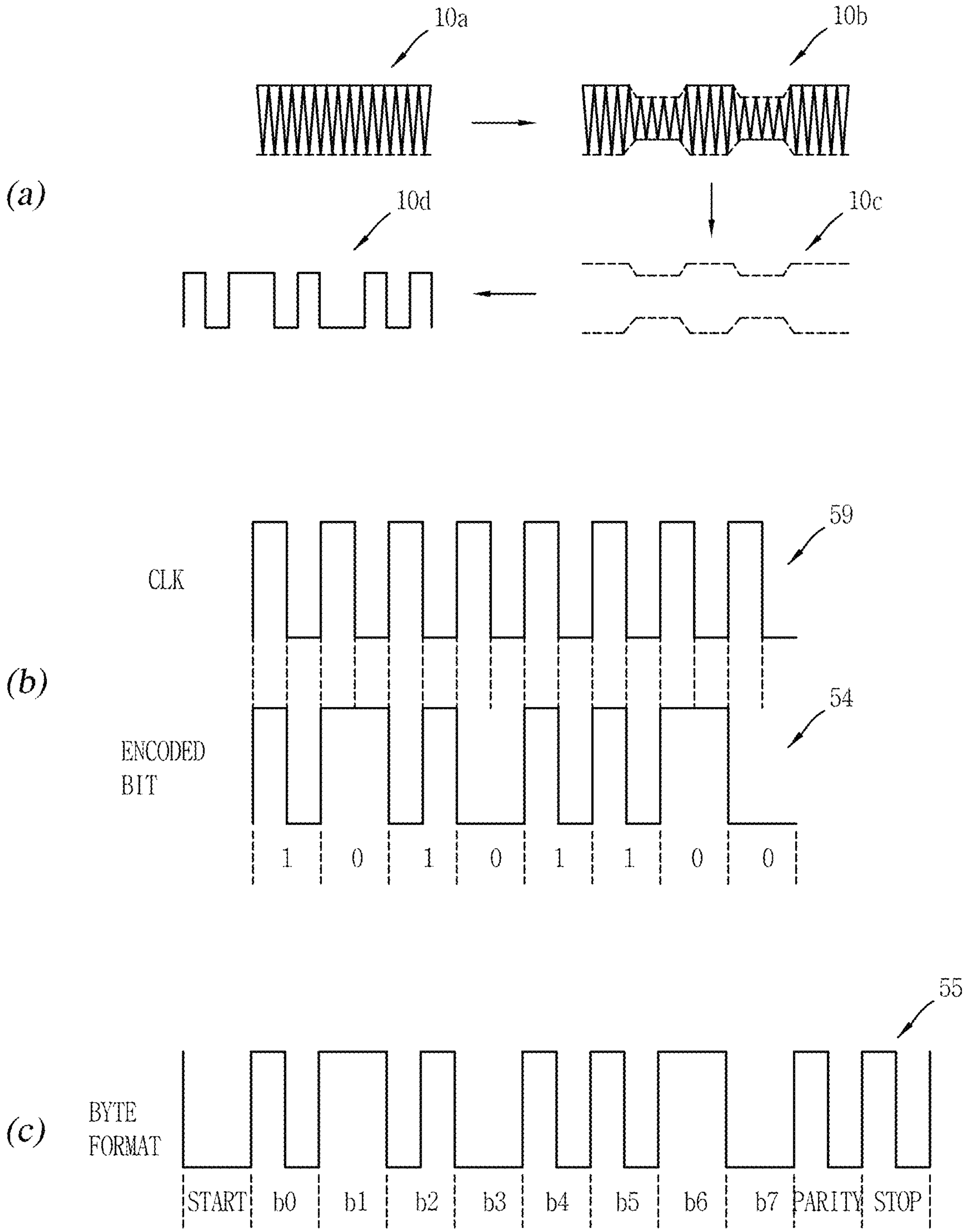
FIG. 11 is a view illustrating forms of signals upon modulation and demodulation executed in a wireless power transfer disclosed herein.

FIG. 10 is a view illustrating a configuration of transmitting or receiving a power control message in transferring power in a wireless manner disclosed herein, and FIG. 11 is a view illustrating forms of signals upon modulation and demodulation executed in the wireless power transfer disclosed herein.

Referring to FIG. 10, the wireless power signal received through the power receiving unit 291 of the wireless power receiver 200, as illustrated in FIG. 11A, may be a non-modulated wireless power signal 51. The wireless power receiver 200 and the wireless power transmitter 100 may establish a resonance coupling according to a resonant frequency, which is set by the resonant circuit 2912 within the power receiving unit 291, and the wireless power signal 51 may be received through the receiving coil 2911*b*.

The power reception control unit 292 may modulate the wireless power signal 51 received through the power receiving unit 291 by changing a load impedance within the modulation/demodulation unit 293. The modulation/demodulation unit 293 may include a passive element 2931 and an active element 2932 for modulating the wireless power signal 51. The modulation/demodulation unit 293 may modulate the wireless power signal 51 to include a packet, which is desired to be transmitted to the wireless power transmitter 100. Here, the packet may be input into the active element 2932 within the modulation/demodulation unit 293.

Afterwards, the power transmission control unit 112 of the wireless power transmitter 100 may demodulate a modulated wireless power signal 52 through an envelop detection, and decode the detected signal 53 into digital data 54. The demodulation may detect a current or voltage flowing into the power conversion unit 111 to be classified into two phases, a HI phase and a LO phase, and acquire a packet to be transmitted by the wireless power receiver 200 based on digital data classified according to the phases.

Hereinafter, a process of allowing the wireless power transmitter 100 to acquire a power control message to be transmitted by the wireless power receiver 200 from the demodulated digital data will be described.

Referring to FIG. 11B, the power transmission control unit 112 detects an encoded bit using a clock signal (CLK) from an envelope detected signal. The detected encoded bit is encoded according to a bit encoding method used in the modulation process at the side of the wireless power receiver 200. The bit encoding method may correspond to any one of non-return to zero (NRZ) and bi-phase encoding.

For instance, the detected bit may be a differential bi-phase (DBP) encoded bit. According to the DBP encoding, the power reception control unit 292 at the side of the wireless power receiver 200 is allowed to have two state transitions to encode data bit 1, and to have one state transition to encode data bit 0. In other words, data bit 1 may be encoded in such a manner that a transition between the HI phase and LO phase is generated at a rising edge and falling edge of the clock signal, and data bit 0 may be encoded in such a manner that a transition between the HI phase and LO phase is generated at a rising edge of the clock signal.

On the other hand, the power transmission control unit 112 may acquire data in a byte unit using a byte format constituting a packet from a bit string detected according to the bit encoding method. For instance, the detected bit string may be transferred by using an 11-bit asynchronous serial format as illustrated in FIG. 12C. In other words, the detected bit may include a start bit indicating the beginning of a byte and a stop bit indicating the end of a byte, and also include data bits (b0 to b7) between the start bit and the stop bit. Furthermore, it may further include a parity bit for checking an error of data. The data in a byte unit constitutes a packet including a power control message.

[For Supporting in-Band Two-Way Communication]

As aforementioned, FIG. 9 has illustrated that the wireless power receiver 200 transmits a packet using a carrier signal 10*a* formed by the wireless power transmitter 100. However, the wireless power transmitter 100 may also transmit data to the wireless power receiver 200 by a similar method.

That is, the power transmission control unit 112 may control the modulation/demodulation unit 113 to modulate data, which is to be transmitted to the wireless power receiver 200, such that the data can be included in the carrier signal 10*a*. Here, the power reception control unit 292 of the wireless power receiver 200 may control the modulation/demodulation unit 293 to execute demodulation so as to acquire data from the modulated carrier signal 10*a*.

Packet Format

Hereinafter, description will be given of a structure of a packet used in communication using a wireless power signal according to the exemplary embodiments disclosed herein.

Figure 12:
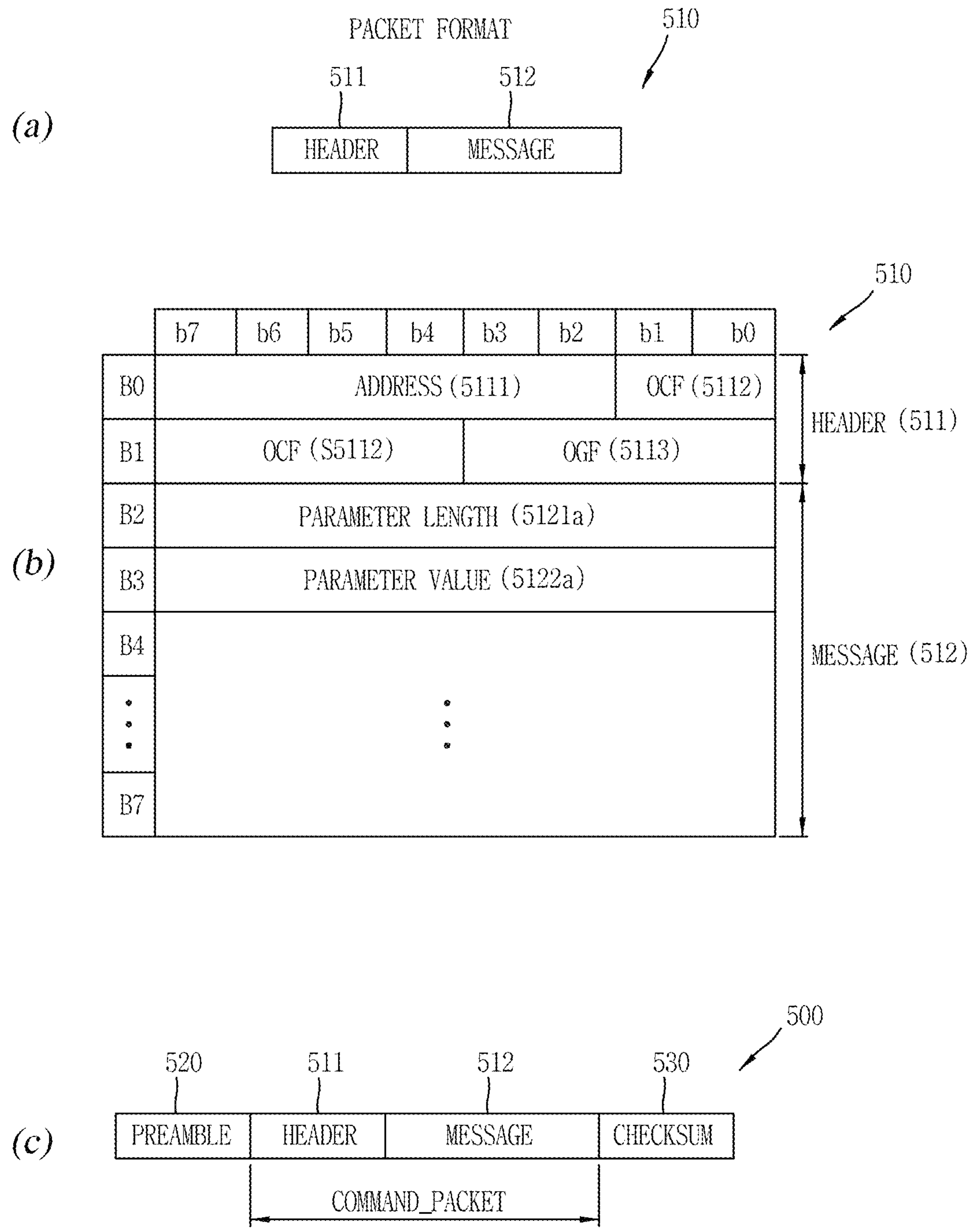
FIG. 12 is a view illustrating a packet including a power control message used in a contactless (wireless) power transfer method according to the embodiments disclosed herein.

FIG. 12 is a view illustrating a packet including a power control message used in a contactless (wireless) power transfer method according to the embodiments disclosed herein.

As illustrated in (a) of FIG. 12, the wireless power transmitter 100 and the wireless power receiver 200 may transmit and receive data desired to transmit in a form of a command packet (command_packet) 510. The command packet 510 may include a header 511 and a message 512.

The header 511 may include a field indicating a type of data included in the message 512. Size and type of the message may be decided based on a value of the field which indicates the type of data.

The header 511 may include an address field for identifying a transmitter (originator) of the packet. For example, the address field may indicate an identifier of the wireless power receiver 200 or an identifier of a group to which the wireless power receiver 200 belongs. When the wireless power receiver 200 transmits the packet 510, the wireless power receiver 200 may generate the packet 510 such that the address field can indicate identification information related to the receiver 200 itself.

The message 512 may include data that the originator of the packet 510 desires to transmit. The data included in the message 512 may be a report, a request or a response for the other party.

According to one exemplary embodiment, the command packet 510 may be configured as illustrated in (b) of FIG. 12. The header 511 included in the command packet 510 may be represented with a predetermined size. For example, the header 511 may have a 2-byte size.

The header 511 may include a reception address field. For example, the reception address field may have a 6-bit size.

The header 511 may include an operation command field (OCF) or an operation group field (OGF). The OGF is a value given for each group of commands for the wireless power receiver 200, and the OCF is a value given for each command existing in each group in which the wireless power receiver 200 is included.

The message 512 may be divided into a length field 5121 of a parameter and a value field 5122 of the parameter. That is, the originator of the packet 510 may generate the message by a length-value pair (5121*a*-5122*a*, etc.) of at least one parameter, which is required to represent data desired to transmit.

Referring to (c) of FIG. 12, the wireless power transmitter 100 and the wireless power receiver 200 may transmit and receive the data in a form of a packet which further has a preamble 520 and a checksum 530 added to the command packet 510.

The preamble 520 may be used to perform synchronization with data received by the wireless power transmitter 100 and detect the start bit of the header 520. The preamble 520 may be configured to repeat the same bit. For instance, the preamble 520 may be configured such that data bit 1 according to the DBP encoding is repeated eleven to twenty five times.

The checksum 530 may be used to detect an error that can be occurred in the command packet 510 while transmitting a power control message.

Operation Phases

Hereinafter, description will be given of operation phases of the wireless power transmitter 100 and the wireless power receiver 200.

Figure 13:
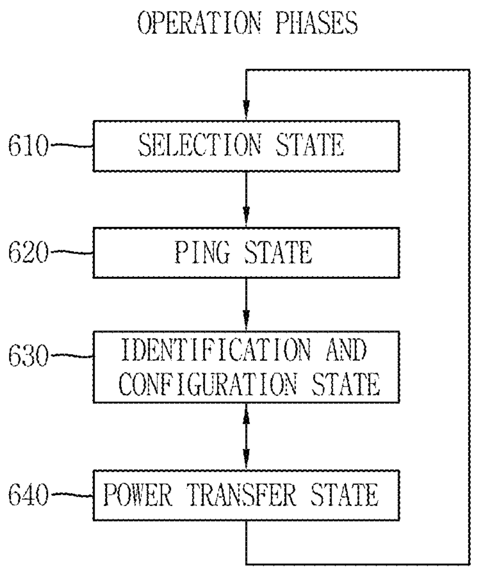
FIG. 13 is a view illustrating operation phases of the wireless power transmitter and wireless power receiver according to the embodiments disclosed herein.
Figure 14:
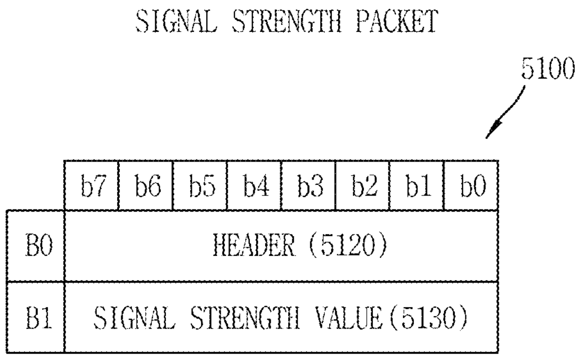

FIG. 13 illustrates the operation phases of the wireless power transmitter 100 and the wireless power receiver 200 according to the embodiments disclosed herein. Furthermore, FIGS. 14 to 18 illustrate the structures of packets including a power control message between the wireless power transmitter 100 and the wireless power receiver 200.

Referring to FIG. 13, the operation phases of the wireless power transmitter 100 and the wireless power receiver 200 for wireless power transfer may be divided into a selection phase (state) 610, a ping phase 620, an identification and configuration phase 630, and a power transfer phase 640.

The wireless power transmitter 100 detects whether or not objects exist within a range that the wireless power transmitter 100 can transmit power in a wireless manner in the selection phase 610, and the wireless power transmitter 100 sends a detection signal to the detected object and the wireless power receiver 200 sends a response to the detection signal in the ping phase 620.

Furthermore, the wireless power transmitter 100 identifies the wireless power receiver 200 selected through the previous phases and acquires configuration information for power transmission in the identification and configuration phase 630. The wireless power transmitter 100 transmits power to the wireless power receiver 200 while controlling power transmitted in response to a control message received from the wireless power receiver 200 in the power transfer phase 640.

Hereinafter, each of the operation phases will be described in detail.

1) Selection Phase

The wireless power transmitter 100 in the selection phase 610 performs a detection process to select the wireless power receiver 200 existing within a detection area. The detection area, as described above, refers to a region in which an object within the relevant area can affect on the characteristic of the power of the power conversion unit 111. Compared to the ping phase 620, the detection process for selecting the wireless power receiver 200 in the selection phase 610 is a process of detecting a change of the power amount for forming a wireless power signal in the power conversion unit at the side of the wireless power transmitter 100 to check whether any object exists within a predetermined range, instead of the scheme of receiving a response from the wireless power receiver 200 using a power control message. The detection process in the selection phase 610 may be referred to as an analog ping process in the aspect of detecting an object using a wireless power signal without using a packet in a digital format in the ping phase 620 which will be described later.

The wireless power transmitter 100 in the selection phase 610 can detect that an object comes in or out within the detection area. Furthermore, the wireless power transmitter 100 can distinguish the wireless power receiver 200 capable of transferring power in a wireless manner from other objects (for example, a key, a coin, etc.) among objects located within the detection area.

As described above, a distance that can transmit power in a wireless manner may be different according to the inductive coupling method and resonance coupling method, and thus the detection area for detecting an object in the selection phase 610 may be different from one another.

First, in case where power is transmitted according to the inductive coupling method, the wireless power transmitter 100 in the selection phase 610 can monitor an interface surface (not shown) to detect the alignment and removal of objects.

Furthermore, the wireless power transmitter 100 may detect the location of the wireless power receiver 200 placed on an upper portion of the interface surface. As described above, the wireless power transmitter 100 formed to include one or more transmitting coils may perform the process of entering the ping phase 620 in the selection phase 610, and checking whether or not a response to the detection signal is transmitted from the object using each coil in the ping phase 620 or subsequently entering the identification phase 630 to check whether identification information is transmitted from the object. The wireless power transmitter 100 may determine a coil to be used for contactless power transfer based on the detected location of the wireless power receiver 200 acquired through the foregoing process.

Furthermore, when power is transmitted according to the resonance coupling method, the wireless power transmitter 100 in the selection phase 610 can detect an object by detecting that any one of a frequency, a current and a voltage of the power conversion unit is changed due to an object located within the detection area.

On the other hand, the wireless power transmitter 100 in the selection phase 610 may detect an object by at least any one of the detection methods using the inductive coupling method and resonance coupling method. The wireless power transmitter 100 may perform an object detection process according to each power transmission method, and subsequently select a method of detecting the object from the coupling methods for contactless power transfer to advance to other phases 620, 630, 640.

On the other hand, for the wireless power transmitter 100, a wireless power signal formed to detect an object in the selection phase 610 and a wireless power signal formed to perform digital detection, identification, configuration and power transmission in the subsequent phases 620, 630, 640 may have a different characteristic in the frequency, strength, and the like. It is because the selection phase 610 of the wireless power transmitter 100 corresponds to an idle state for detecting an object, thereby allowing the wireless power transmitter 100 to reduce consumption power in the idle state or generate a specialized signal for effectively detecting an object.

2) Pine Phase

The wireless power transmitter 100 in the ping phase 620 performs a process of detecting the wireless power receiver 200 existing within the detection area through a power control message. Compared to the detection process of the wireless power receiver 200 using a characteristic of the wireless power signal and the like in the selection phase 610, the detection process in the ping phase 620 may be referred to as a digital ping process.

The wireless power transmitter 100 in the ping phase 620 forms a wireless power signal to detect the wireless power receiver 200, modulates the wireless power signal modulated by the wireless power receiver 200, and acquires a power control message in a digital data format corresponding to a response to the detection signal from the modulated wireless power signal. The wireless power transmitter 100 may receive a power control message corresponding to the response to the detection signal to recognize the wireless power receiver 200 which is a subject of power transmission.

The detection signal formed to allowing the wireless power transmitter 100 in the ping phase 620 to perform a digital detection process may be a wireless power signal formed by applying a power signal at a specific operating point for a predetermined period of time. The operating point may denote a frequency, duty cycle, and amplitude of the voltage applied to the transmitting (Tx) coil. The wireless power transmitter 100 may generate the detection signal generated by applying the power signal at a specific operating point for a predetermined period of time, and attempt to receive a power control message from the wireless power receiver 200.

On the other hand, the power control message corresponding to a response to the detection signal may be a message indicating strength of the wireless power signal received by the wireless power receiver 200. For example, the wireless power receiver 200 may transmit a signal strength packet 5100 including a message indicating the received strength of the wireless power signal as a response to the detection signal as illustrated in FIG. 15. The packet 5100 may include a header 5120 for notifying a packet indicating the signal strength and a message 5130 indicating strength of the power signal received by the wireless power receiver 200. The strength of the power signal within the message 5130 may be a value indicating a degree of inductive coupling or resonance coupling for power transmission between the wireless power transmitter 100 and the wireless power receiver 200.

The wireless power transmitter 100 may receive a response message to the detection signal to find the wireless power receiver 200, and then extend the digital detection process to enter the identification and configuration phase 630. In other words, the wireless power transmitter 100 maintains the power signal at a specific operating point subsequent to finding the wireless power receiver 200 to receive a power control message required in the identification and configuration phase 630.

However, if the wireless power transmitter 100 is not able to find the wireless power receiver 200 to which power can be transferred, then the operation phase of the wireless power transmitter 100 will be returned to the selection phase 610.

3) Identification and Configuration Phase

The wireless power transmitter 100 in the identification and configuration phase 630 may receive identification information and/or configuration information transmitted by the wireless power receiver 200, thereby controlling power transmission to be effectively carried out.

Figure 15A:
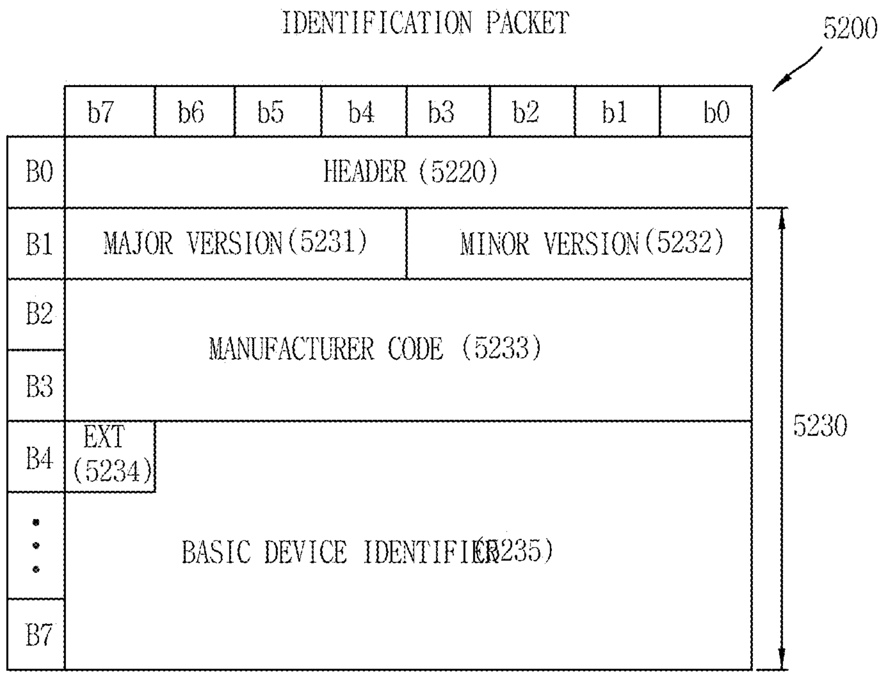
Figure 15B:
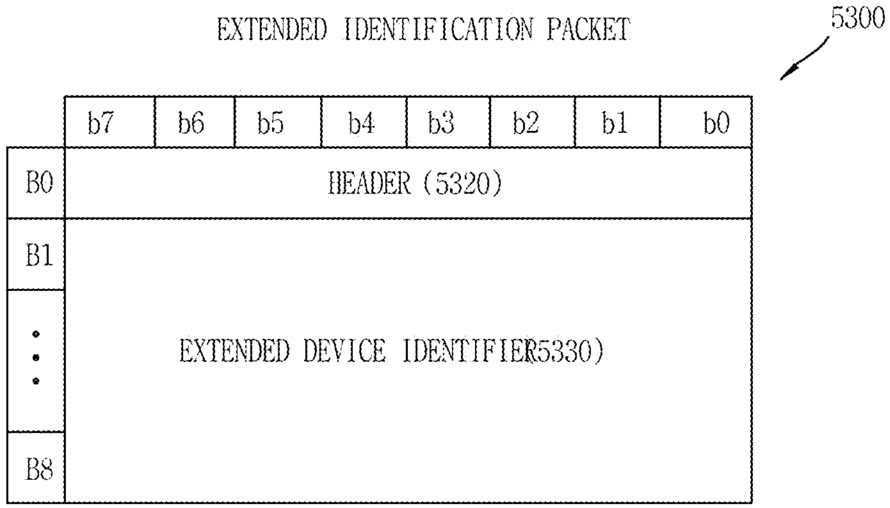

The wireless power receiver 200 in the identification and configuration phase 630 may transmit a power control message including its own identification information. For this purpose, the wireless power receiver 200, for instance, may transmit an identification packet 5200 including a message indicating the identification information of the wireless power receiver 200 as illustrated in FIG. 15A. The packet 5200 may include a header 5220 for notifying a packet indicating identification information and a message 5230 including the identification information of the electronic device. The message 5230 may include information (2531 and 5232) indicating a version of the contract for contactless power transfer, information 5233 for identifying a manufacturer of the wireless power receiver 200, information 5234 indicating the presence or absence of an extended device identifier, and a basic device identifier 5235. Furthermore, if it is displayed that an extended device identifier exists in the information 5234 indicating the presence or absence of an extended device identifier, then an extended identification packet 5300 including the extended device identifier as illustrated in FIG. 15B will be transmitted in a separate manner. The packet 5300 may include a header 5320 for notifying a packet indicating an extended device identifier and a message 5330 including the extended device identifier. When the extended device identifier is used as described above, information based on the manufacturer's identification information 5233, the basic device identifier 5235 and the extended device identifier 5330 will be used to identify the wireless power receiver 200.

The wireless power receiver 200 may transmit a power control message including information on expected maximum power in the identification and configuration phase 630. To this end, the wireless power receiver 200, for instance, may transmit a configuration packet 5400 as illustrated in FIG. 16. The packet may include a header 5420 for notifying that it is a configuration packet and a message 5430 including information on the expected maximum power. The message 5430 may include power class 5431, information 5432 on expected maximum power, an indicator 5433 indicating a method of determining a current of a main cell at the side of the wireless power transmitter, and the number 5434 of optional configuration packets. The indicator 5433 may indicate whether or not a current of the main cell at the side of the wireless power transmitter is determined as specified in the contract for wireless power transfer.

On the other hand, the wireless power transmitter 100 may generate a power transfer contract which is used for power charging with the wireless power receiver 200 based on the identification information and/or configuration information. The power transfer contract may include the limits of parameters determining a power transfer characteristic in the power transfer phase 640.

The wireless power transmitter 100 may terminate the identification and configuration phase 630 and return to the selection phase 610 prior to entering the power transfer phase 640. For instance, the wireless power transmitter 100 may terminate the identification and configuration phase 630 to find another electronic device that can receive power in a wireless manner.

4) Power Transfer Phase

The wireless power transmitter 100 in the power transfer phase 640 transmits power to the wireless power receiver 200.

The wireless power transmitter 100 may receive a power control message from the wireless power receiver 200 while transferring power, and control a characteristic of the power applied to the transmitting coil in response to the received power control message. For example, the power control message used to control a characteristic of the power applied to the transmitting coil may be included in a control error packet 5500 as illustrated in FIG. 18. The packet 5500 may include a header 5520 for notifying that it is a control error packet and a message 5530 including a control error value. The wireless power transmitter 100 may control the power applied to the transmitting coil according to the control error value. In other words, a current applied to the transmitting coil may be controlled so as to be maintained if the control error value is "0," reduced if the control error value is a negative value, and increased if the control error value is a positive value.

The wireless power transmitter 100 may monitor parameters within a power transfer contract generated based on the identification information and/or configuration information in the power transfer phase 640. As a result of monitoring the parameters, if power transmission to the wireless power receiver 200 violates the limits included in the power transfer contract, then the wireless power transmitter 100 may cancel the power transmission and return to the selection phase 610.

The wireless power transmitter 100 may terminate the power transfer phase 640 based on a power control message transferred from the wireless power receiver 200.

For example, if the charging of a battery has been completed while charging the battery using power transferred by the wireless power receiver 200, then a power control message for requesting the suspension of wireless power transfer will be transferred to the wireless power transmitter 100. In this case, the wireless power transmitter 100 may receive a message for requesting the suspension of the power transmission, and then terminate wireless power transfer, and return to the selection phase 610.

For another example, the wireless power receiver 200 may transfer a power control message for requesting renegotiation or reconfiguration to update the previously generated power transfer contract. The wireless power receiver 200 may transfer a message for requesting the renegotiation of the power transfer contract when it is required a larger or smaller amount of power than the currently transmitted power amount. In this case, the wireless power transmitter 100 may receive a message for requesting the renegotiation of the power transfer contract, and then terminate contactless power transfer, and return to the identification and configuration phase 630.

To this end, a message transmitted by the wireless power receiver 200, for instance, may be an end power transfer packet 5600 as illustrated in FIG. 18. The packet 5600 may include a header 5620 for notifying that it is an end power transfer packet and a message 5630 including an end power transfer code indicating the cause of the suspension. The end power transfer code may indicate any one of charge complete, internal fault, over temperature, over voltage, over current, battery failure, reconfigure, no response, and unknown error.

Communication Method of Plural Electronic Devices

Hereinafter, description will be given of a method by which at least one electronic device performs communication with one wireless power transmitter using wireless power signals.

Figure 19:
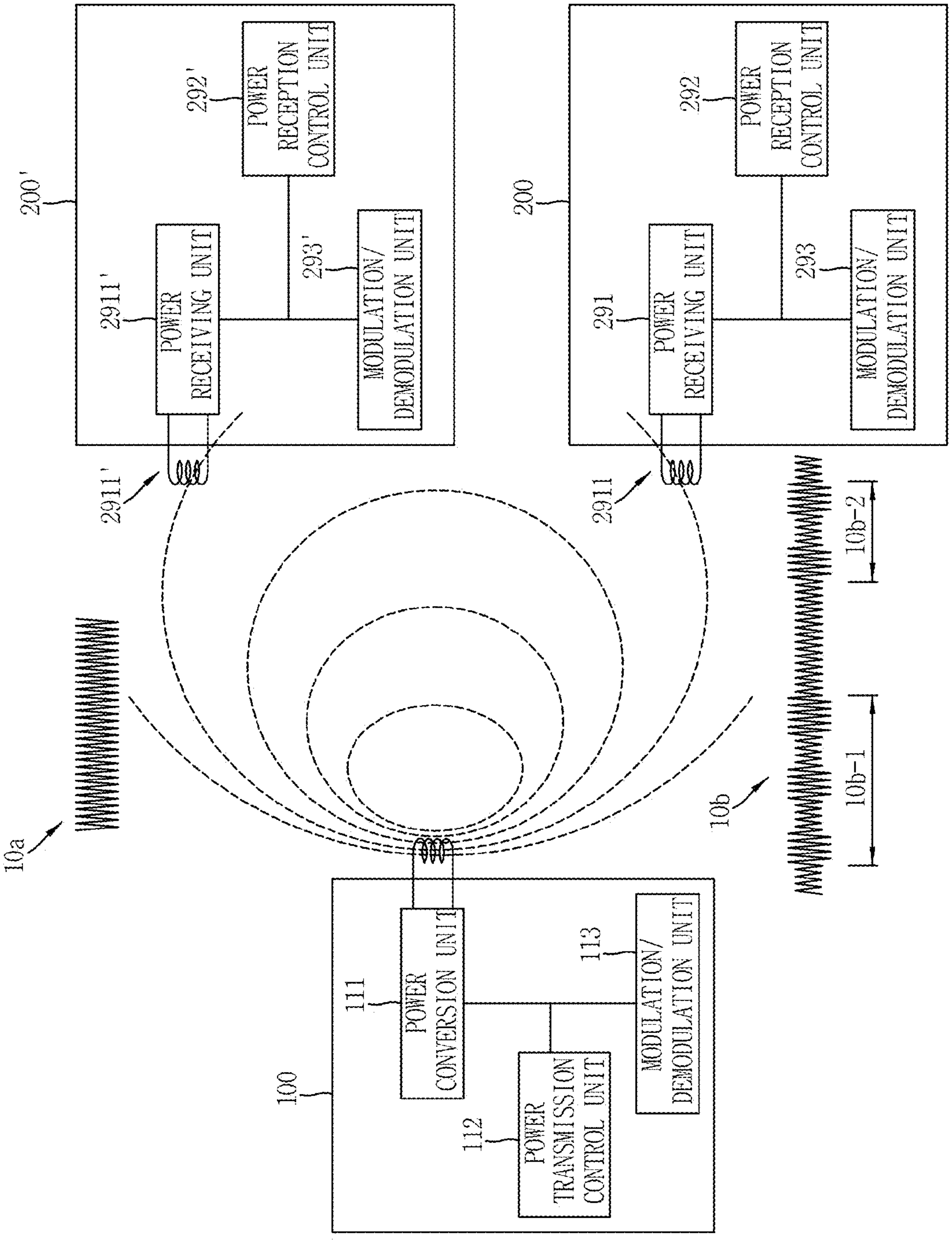
FIG. 19 is a conceptual view illustrating a method of transferring power to at least one wireless power receiver from a wireless power transmitter.

FIG. 19 is a conceptual view illustrating a method of transferring power to at least one wireless power receiver from a wireless power transmitter.

The wireless power transmitter 100 may transmit power to one or more wireless power receivers 200 and 200'. FIG. 19 illustrates two electronic devices 200 and 200', but the methods according to the exemplary embodiments disclosed herein may not be limited to the number of electronic devices shown.

An active area and a detection area may be different according to the wireless power transfer method of the wireless power transmitter 100. Therefore, the wireless power transmitter 100 may determine whether there is a wireless power receiver located on the active area or the detection area according to the resonance coupling method or a wireless power receiver located on the active area or the detection area according to the induction coupling method. According to the determination result, the wireless power transmitter 100 which supports each wireless power transfer method may change the power transfer method for each wireless power receiver.

In the wireless power transfer according to the exemplary embodiments disclosed herein, when the wireless power transmitter 100 transfers power to the one or more electronic devices 200 and 200' according to the same wireless power transfer method, the electronic devices 200 and 200' may perform communications through the wireless power signals without inter-collision.

Referring to FIG. 19, a wireless power signal 10*a* generated by the wireless power transmitter 100 may arrive at the first electronic device 200' and the second electronic device 200, respectively. The first and second electronic devices 200' and 200 may transmit wireless power messages using the generated wireless power signal 10*a*.

The first electronic device 200' and the second electronic device 200 may operate as wireless power receivers for receiving a wireless power signal. The wireless power receiver in accordance with the exemplary embodiments disclosed herein may include a power receiving unit 291', 291 to receive the generated wireless power signal, a modulation/demodulation unit 293', 293 to modulate or demodulate the received wireless power signal, and a controller 292', 292 to control each component of the wireless power receiver.

In addition, the present disclosure provides a communication protocol selecting method in a wireless charging system (or a wireless power transmitter/receiver) employing multiple communication protocols, a structure of a transmitter interoperable with an induction method and a resonance method in a wireless charging system, and a communication method in a transmitter interoperable with an induction method and a resonance method.

Communication Protocol Selecting Method in Wireless Power Transmitter/Receiver Using Multiple Communication Protocols Hereinafter, description will be given of a communication protocol selecting method in a wireless power transmitter/receiver employing multiple communication protocols, with reference to FIGS. 20 to 22.

The following description relates to a communication protocol selecting method, capable of supporting different communication methods between a wireless power transmitter and a wireless power receiver, so as to allow wireless power transmission to be applicable in various manners.

Also, in the following description, Chapter 6 Communication Interface may be extended for use by adding a new phase between the identification & configuration phase and the power transfer phase of the chapter 5 system control in Wireless power Specification Part 1 System Description of Wireless Power Consortium (WPC).

Figure 20:
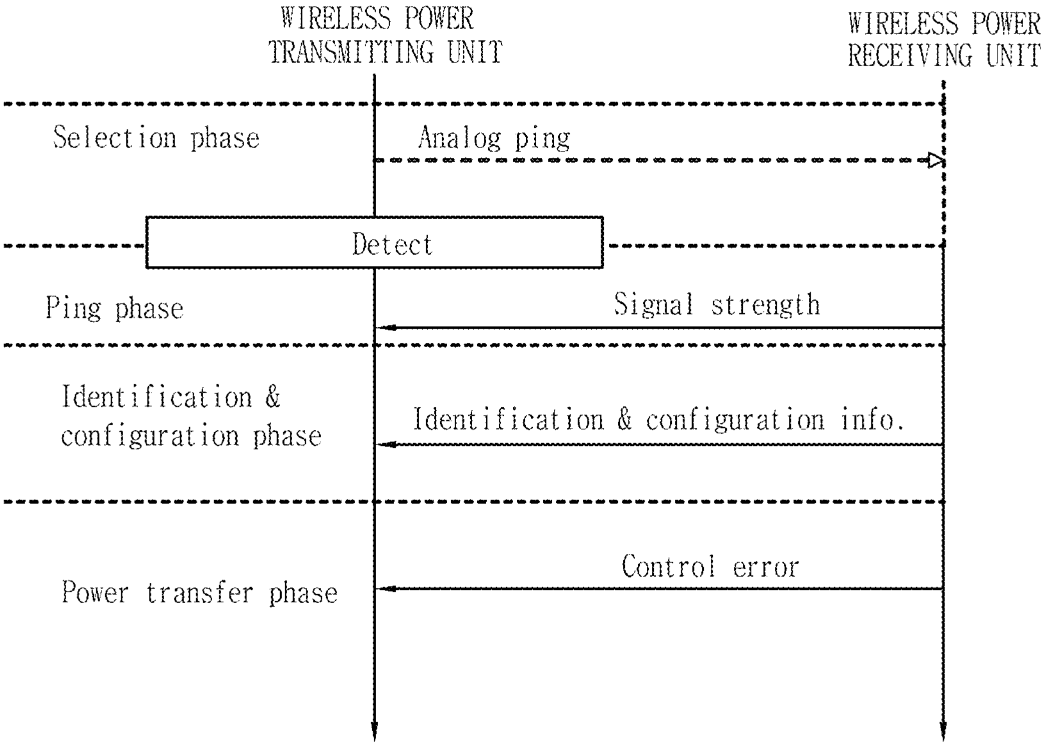
FIG. 20 is a conceptual view of a WPC communication flow.
Figure 21:
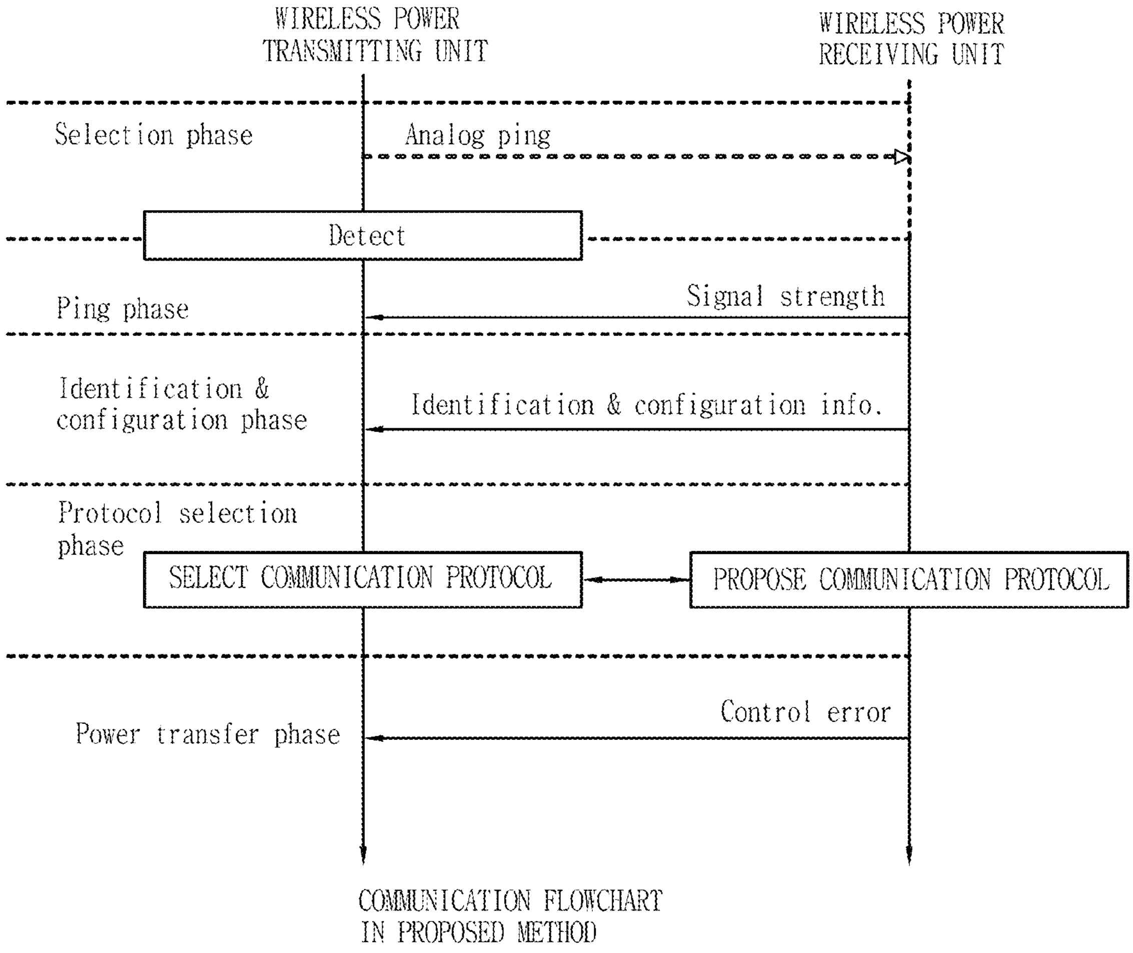
FIG. 21 is a view illustrating a communication flow in a method according to one exemplary embodiment disclosed herein.
Figure 22:
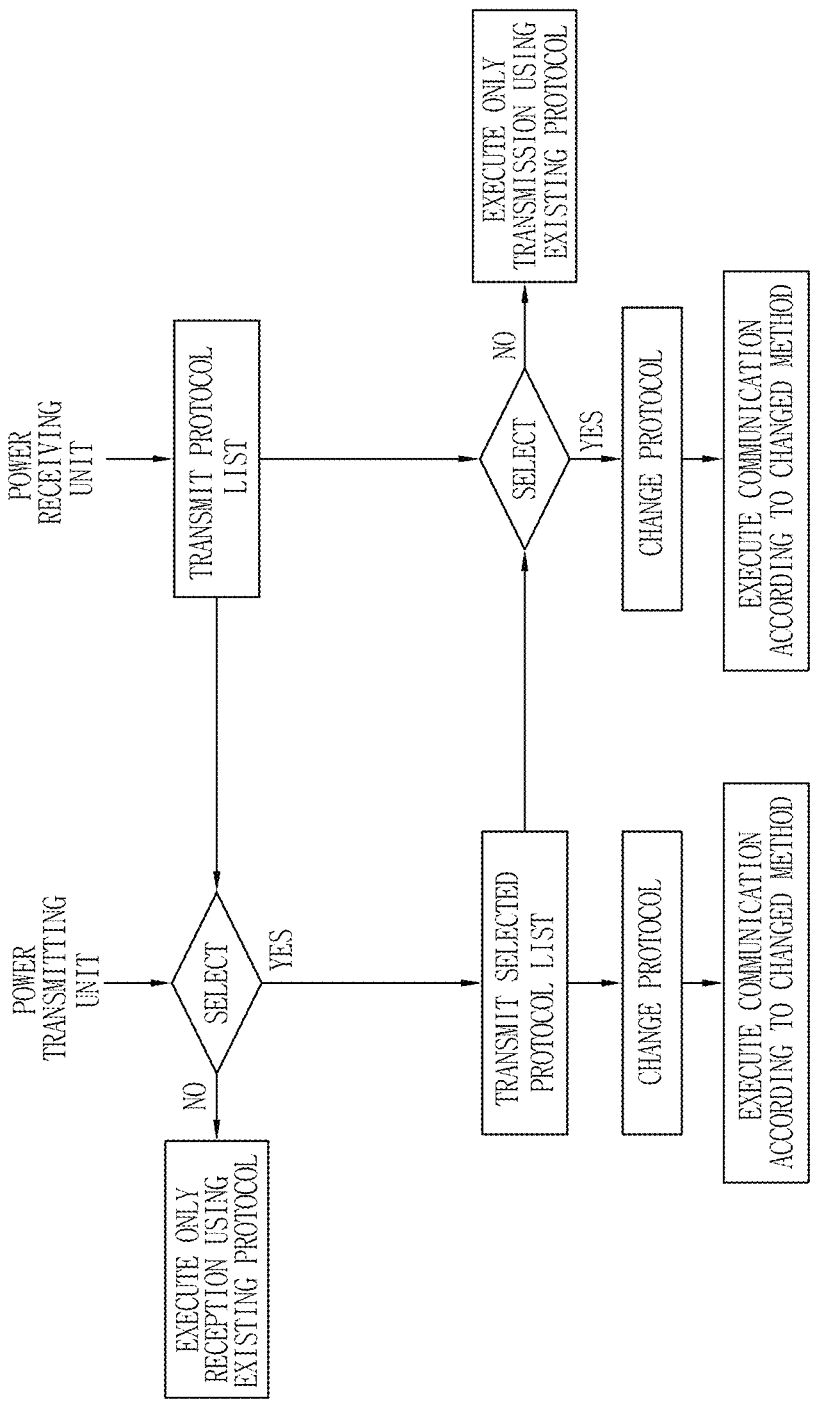
FIG. 22 is a flowchart corresponding to the communication flow of FIG. 21.

FIG. 20 is a conceptual view of a WPC communication flow, FIG. 21 is a view illustrating a communication flow in a method according to one exemplary embodiment disclosed herein, and FIG. 22 is a flowchart corresponding to the communication flow of FIG. 21.

World Power Consortium (WPC) is undergoing standardization of wireless power transfer technologies such that wireless power transmitters and receivers fabricated in different companies can play well their roles. A wireless power transfer method prescribed in the WPC merely supports a uni-directional communication from a power receiving unit to a power transmitting unit for stabilized output control. This communication is mainly performed to feedback a control error from the power receiving unit to the power transmitting unit. Only an amplitude modulation using a change of a magnetic field is employed as a modulation method, and a transmission rate is merely several KHz. Therefore, this type of communication method is vulnerable to electric, magnetic disturbances, and is unable to be applied when it is required for transferring information from the power transmitting unit and the power receiving unit due the support of only the unidirectional communication. The communication method currently has a limitation in application requiring for transfer of a large quantity of information, caused due to a slow transmission rate.

The present disclosure may widen an application range of a wireless power transmitter/receiver by proposing a communication protocol selecting method, which allows a wireless power transmitting unit and a wireless power receiving unit to use a plurality of communication protocols prior to the power transfer phase in the WPC standard.

As illustrated in FIGS. 21 and 22, first, a wireless power transmitter/receiver generates a communication protocol list by selecting communication protocols from a communication protocol catalog, and selects a communication method from the list.

Here, the communication protocol catalog is generated by previously designating every supportable communication protocol between the wireless power transmitter and the wireless power receiver. The wireless power transmitter and the wireless power receiver implement a communication function by selecting communication protocols from the catalog. The communication protocol catalog includes data as a set of bits, which includes details of communication methods, and communication directions and numbers to transfer the details.

The data composed of the number including the communication direction and the communication method may be located in a user definition area expressed in the WPC standard so as to be kept compatible with the conventional method.

The communication protocol catalog refers to a catalog containing every previously-prescribed (designated) communication protocol, which is supportable by a wireless power transmitter, and may be defined in the WPC standard. The communication protocol may include all of physical, logical, applicative details, and be available if prescribed in advance.

Each communication protocol may be provided with a single communication protocol number. In one example, a protocol is provided with a 7-bit number, and a communication direction may be expressed by the highest 1-bit (see a communication protocol catalog of Table 1 and a communication protocol number configuration of Table 2).

TABLE 1

| Communication protocol | Number |
|---|---|
| ASK/NRZI | 0x01 |
| ASK/NRZ-L | 0x02 |
| FSK/Manchester | 0x03 |
| FSK/NRZI | 0x04 |
| . . . | . . . |
| Zigbee | 0x10 |
| Bluetooth | 0x11 |
| . . . | . . . |

TABLE 2

| b7 | b6 | b5 | b4 | b3 | b2 | b1 | b0 |
|---|---|---|---|---|---|---|---|
| Direction | Communication protocol number | | | | | | |

In the above embodiment, the communication protocol catalog may express totally 128 types of communication protocols in the range of 0x00~7F. Each of the wireless power transmitter and the wireless power receiver generates a communication protocol list supportable thereby among the communication protocol catalog (see a communication protocol list of Table 3).

TABLE 3

| | b7 | b6 | b5 | b4 | b3 | b2 | b1 | b0 |
|---|---|---|---|---|---|---|---|---|
| B0 | Direction | Communication protocol number | | | | | | |
| B1 | Direction | Communication protocol number | | | | | | |
| B2 | Direction | Communication protocol number | | | | | | |
| B3 | Direction | Communication protocol number | | | | | | |

Afterwards, the power receiving unit may send communication protocol information supportable thereby to the power transmitting unit such that the power transmitting unit can select a transmitting method. Also, a method of transferring a plurality of communication protocols basically complies with a communication protocol which ensures information transfer between the power transmitting unit and the power receiving unit. The plurality of communication protocols include communication protocols for a communication method according to an internal change of a power transfer channel or a communication method through another channel other than the power transfer channel.

In more detail, the wireless power receiver generates a communication protocol list supportable thereby, and transmits the generated list to the wireless power transmitter according to the conventional transmission method. The wireless power receiver may support one or more communication protocols. According to application manners, the wireless power receiver may generate a list by selecting only one communication protocol or a list including all of communication protocols supportable thereby. The communication list may be allowed if including supportable communication protocols, and the number of supportable communication protocols in the list may depend on an application manner. Also, in the list, an upper communication protocol listed above in the list has a higher priority.

The communication protocol list may be generated by listing actually supportable communication protocols among those communication protocols included in the communication protocol catalog. In case of supporting a plurality of communication protocols, priorities may be provided in the order included in the list. A communication protocol with a higher priority may be located above in the list.

The wireless power transmitter generates a communication protocol list in the same form by including communication protocols supportable thereby among those included in the received list, and notifies it to the wireless power receiver.

For example, upon reception of the communication protocol list from the wireless power receiver, the wireless power transmitter generates a communication protocol list by selecting its supportable communication protocols one by one according to communication directions from the received communication protocol list, and notifies the generated communication protocol list to the wireless power receiver. The wireless power transmitter gets ready for executing communication using the selected communication protocol. Upon a failure of the reception of the communication protocol list, the wireless power transmitter performs a wireless power transmission function merely by executing a reception according to the existing method.

The wireless power receiver checks the communication protocol list notified by the wireless power transmitter, and gets ready for executing communication according to the communication protocol included in the list. When it has not received a response or receives a response without the communication protocol list, the wireless power receiver performs a wireless power reception function according to the existing method.

The aforementioned communication protocol selecting method may extend an application range of a wireless charging system such that a new communication protocol can be employed between wireless charging devices. In addition, upon adding communication protocols corresponding to disturbances, it may contribute to improvement of performance.

Also, the communication protocol selecting method may be applied to a wireless charging system, which is interoperable with an induction method and a resonance method, and a communication method thereof. Hereinafter, the wireless charging system and the communication method will be described in more detail.

Transmitter Interoperable with Induction Method and Resonance Method in Wireless Charging System and Communication Method Thereof Hereinafter, description will be given of a method for extending an active area of a mount-type wireless charger with reference to FIGS. 23 to 35. In more detail, description will be given of a structure of a wireless charging transmitting unit, which is capable of being compatible with two receiving units complying with an already-commercialized induction method and a resonance method prior to being commercialized, respectively, and also a communication method between a transmitter and a receiver through another channel other than a power channel.

WPC has already adopted the induction method in wireless charging and defined a communication method between the transmitter and the receiver. On the other hand, the resonance method has the same basic principle as the induction method in view of using an electromagnetic induction, but differs from the induction method according to matching or non-matching of frequencies between a transmitting unit and a receiving unit, and according to a Q value. In the resonance method, coupling between the transmitting unit and the receiving unit may generally be increased and a transmission distance may be improved in a manner of increasing the Q value. That is, according to the resonance method, the transmitter and the receiver may have higher coupling therebetween, and a degree of freedom with respect to distance and posture may be enhanced.

In order to increase a degree of freedom and simultaneously enhance power efficiency, coil design technologies for a transmitter and a receiver are required. There may be no requirement for compatibility if the two methods are separately developed into products. However, to newly enter the resonance method from an already-commercialized induction method, the need of a transmitter which can transiently be compatible with both of the two methods may be taken into account.

Therefore, the present disclosure proposes a coil which is compatible (interoperable) with an induction type receiver and a resonance type receiver in wireless charging.

As one example, a power transmission unit of a wireless power transmitter includes first and second coils.

The first coil is configured to generate a magnetic field for power transmission of the induction method. The second coil is wound around the first coil and configured to generate a magnetic field, which vibrates at a resonant frequency for power transmission of the resonance method.

Figure 23:
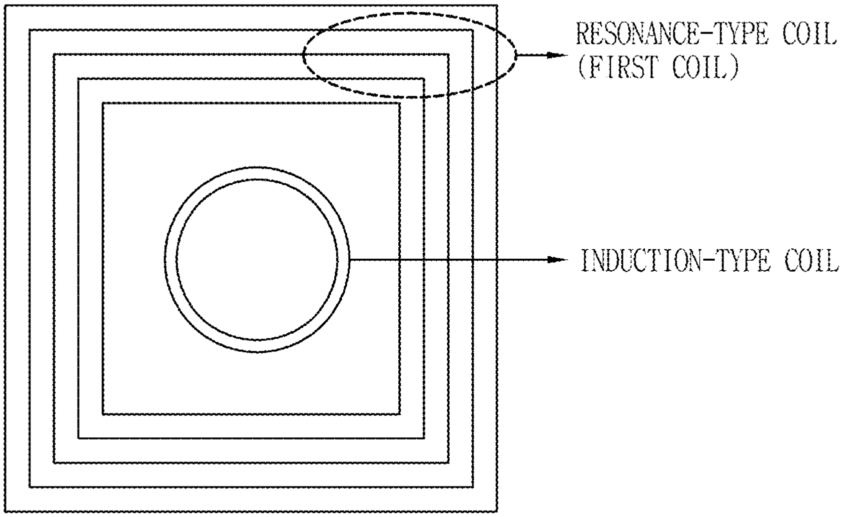
FIG. 23 is a schematic view of coils of an inductance/resonance transmitting unit.

The structure may result in designing a coil shape, which can correspond to induction and resonance-type receiving units. FIG. 23 is a schematic view of the induction/resonance transmitting coils, in the structure that an induction coil (the first coil) is located inside and a resonance coil (the second coil) is located outside so as to be interoperable with the two methods.

Here, since the operation of the first coil depends on the shape and a characteristic value of the second coil, the characteristic of the second coil may be quantitatively limited.

Figure 24:
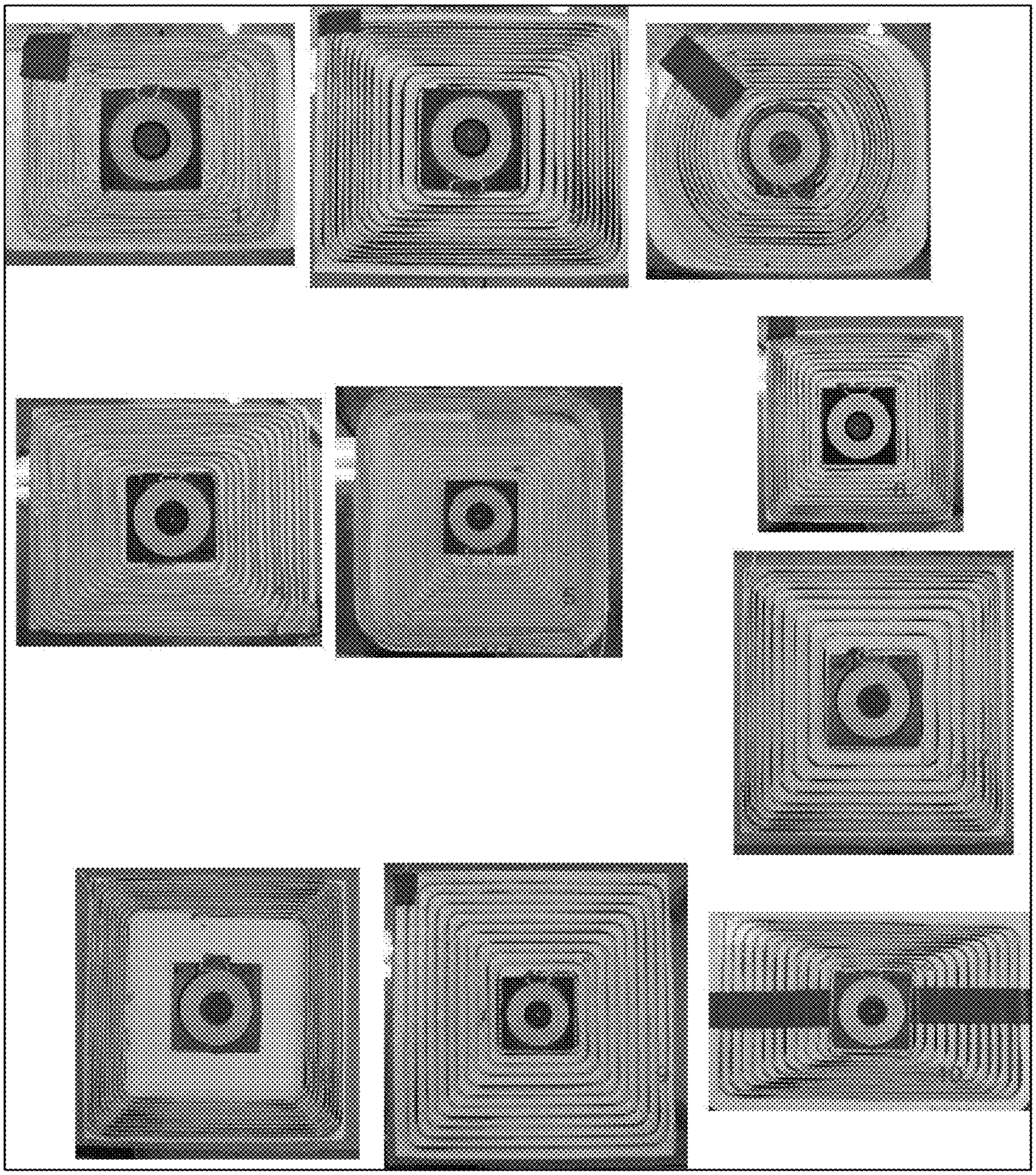
FIG. 24 is images of an exemplary structure of a transmitting unit compatible with the induction method and the resonance method and an experimental group.

FIG. 24 illustrates images of an exemplary structure of a transmitting unit compatible with the induction method and the resonance method and an experimental group. Characteristic values were measured for totally 10 induction/resonance coil designs of FIG. 24, and four main factors were defined according to the measurements so as to guide designing of a compatible coil.

As illustrated in FIG. 24, the first coil is wound into a circular shape, and the second coil is wound into a quadrilateral shape at least part of which is linear.

Figure 25:
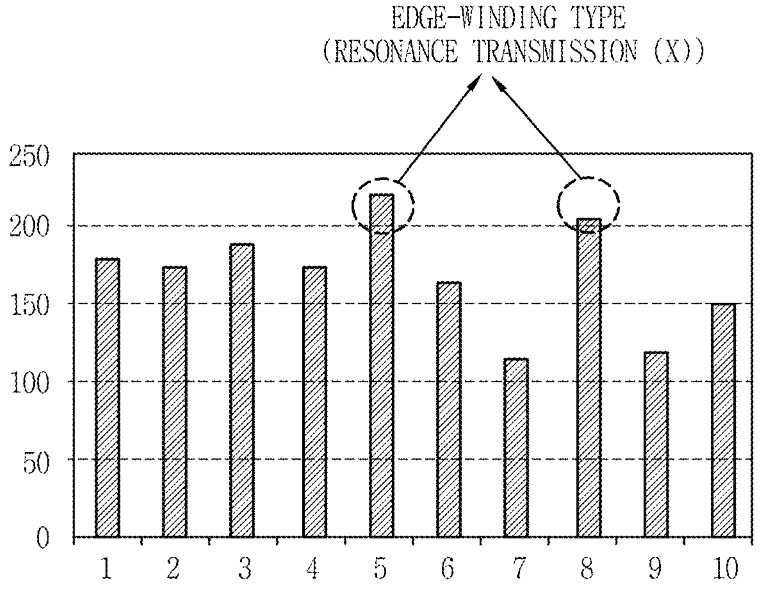
FIG. 25 is a graph illustrating a coil shape-based Q value (or a Q factor).
Figure 26:
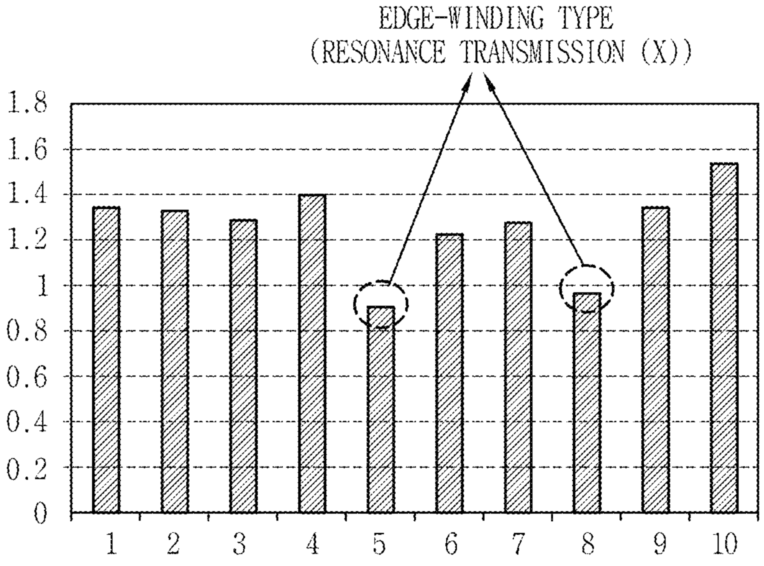
FIG. 26 is a graph illustrating a coil shape-based impedance variation.
Figure 27:
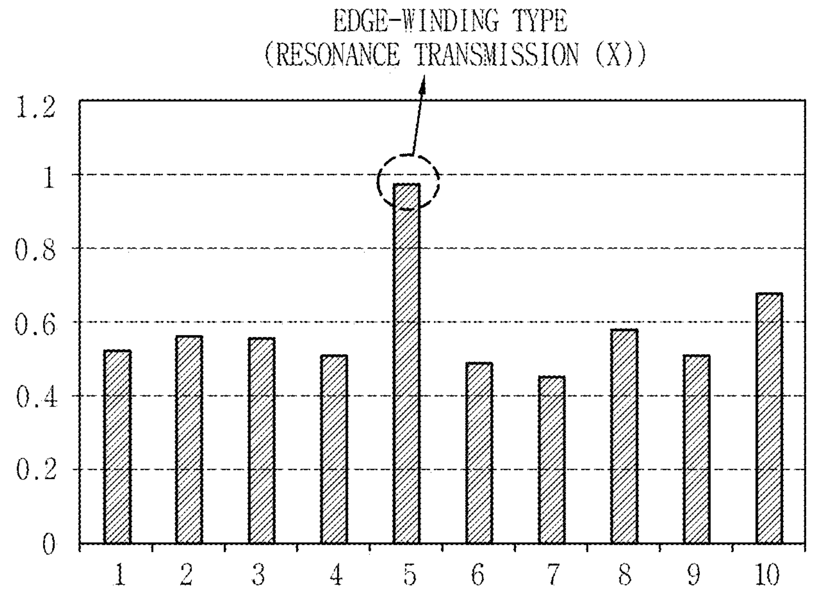
FIG. 27 is a graph illustrating a coil shape-based reactance variation.
Figure 28:
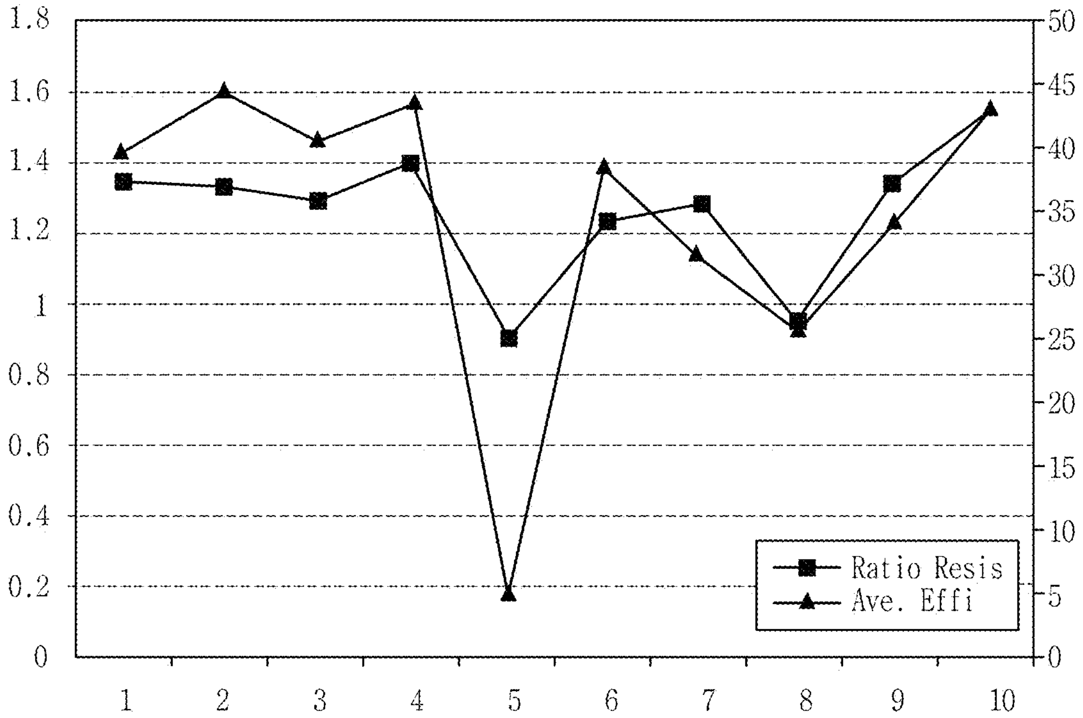
FIG. 28 is a graph illustrating Re{lm} efficiency for each shape.

FIG. 25 is a graph illustrating a coil shape-based Q value (Q factor), FIG. 26 is a graph illustrating a coil shape-based impedance variation, FIG. 27 is a graph illustrating a coil shape-based reactance variation, and FIG. 28 is a graph illustrating a coil shape-based Re{lm} efficiency.

As illustrated in those drawings, for an edge-winding type such as fifth and eighth shapes, a high Q value has but resonance transmission is unable. Therefore, the Q value of an induction/resonance-compatible transmitting unit (the second coil) may be limited in the range of 100 to 200.

A ratio of a real number part of edge impedance to a real number part of central impedance of the second coil is defined by the following Equation 2.

$$\text{Ratio(Re)} = \frac{\text{Re(Imp)}@Rx\text{ Edge}}{\text{Re(Imp)}@Rx\text{ Center}} \qquad \text{[Equation 2]}$$

where Re{f}:f denotes a real number part.

As illustrated in FIG. 26, comparing change values of the impedance real number part (Re{lm}) according to a position (an edge portion or a central portion) of a receiving unit, transmission of the second coil is enabled when the Re{lm} is great at the central portion.

Therefore, a ratio (Re) of the edge impedance real number part to the central impedance real number part of the second coil is limited to be greater than 1.2. The upper limit of the ratio may not be limited, but have an appropriate implementable value.

The ratio of an edge impedance imaginary number part to a central impedance imaginary number part of the second coil is defined by the following Equation 3.

$$\text{Ratio(Im)} = \frac{\text{Im(Imp)}@Rx\text{ Edge}}{\text{Im(Imp)}@Rx\text{ Center}} \qquad \text{[Equation 3]}$$

where Im{f}:f denotes an imaginary number part.

As illustrated in FIG. 27, comparing reactance change values according to a position (an edge portion or a central portion) of a receiving unit, the Ratio {Im} should be smaller than 1 at the central portion. Therefore, the Ratio {Im} of the second coil is limited to be smaller than 1.

Also, the second coil is formed in a flat spiral structure, and has a non-uniform interval. For example, the interval of the coil whose efficiency is over 40% may be 1, 2, 3, 6, 10 and the like in case of the non-uniform interval.

Here, the interval of the second coil may gradually get narrow from an inner circumference to an outer circumference of the second coil. The second coil may have a shape that a single wire of a litz wire or a copper wire is wound from the inner circumference to the outer circumference. The interval variation may be configured as shown in the following Table 4, for example.

TABLE 4

| Index | Interval variation (Inner circumference → Outer circumference, unit: mm |
|---|---|
| 1 | 6→5→4→3→2→2→2→2→2→2 |
| 2 | 6→4→4→4→4→4→4→2→2→2 |
| 3 | 3.5→3→3→3→2.5→2→1.5→1→0.5→0.5 |

Figure 29A:
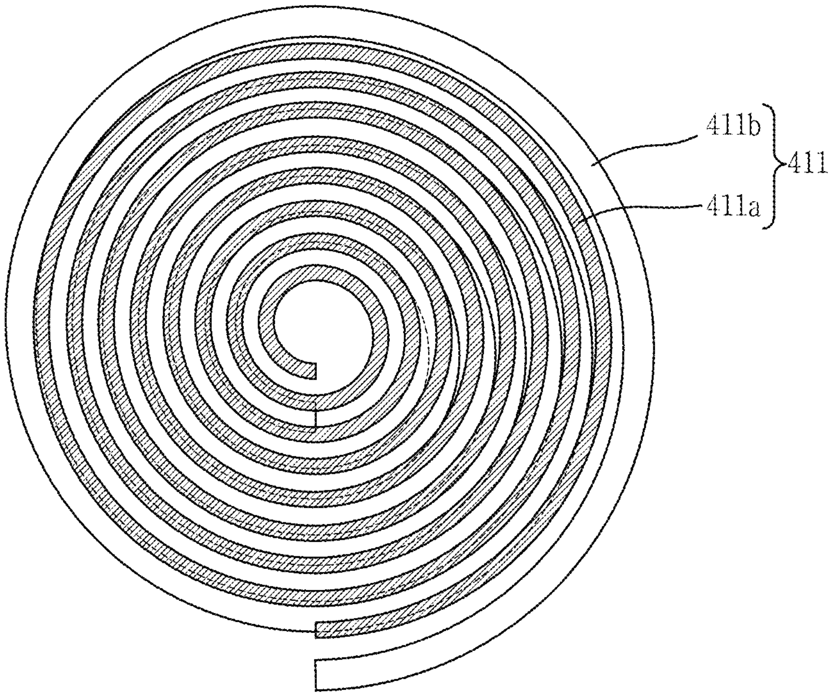
FIGS. 29A, 29B and 29C are planar, front and perspective views of another exemplary embodiment disclosed herein.
Figure 29B:
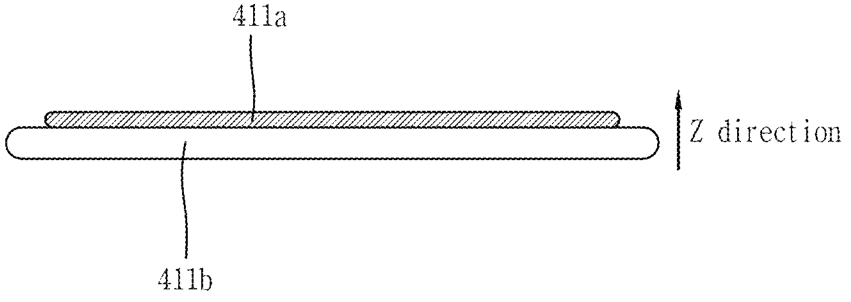
Figure 29C:
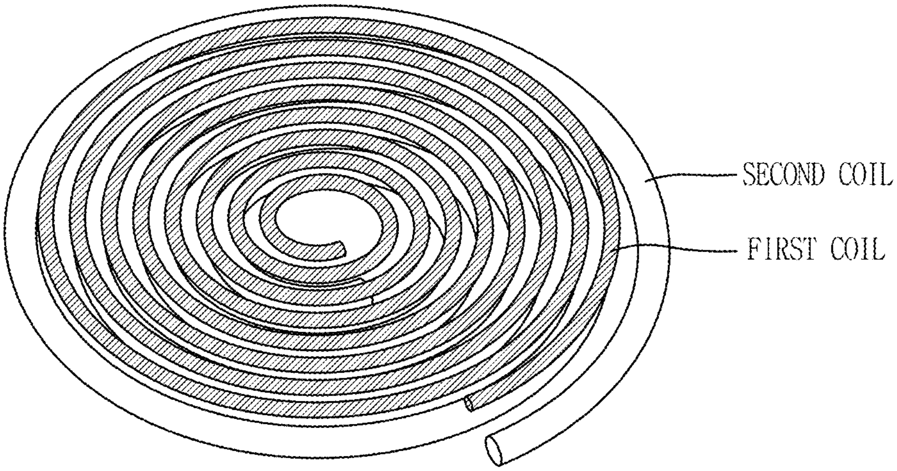
Figure 30:
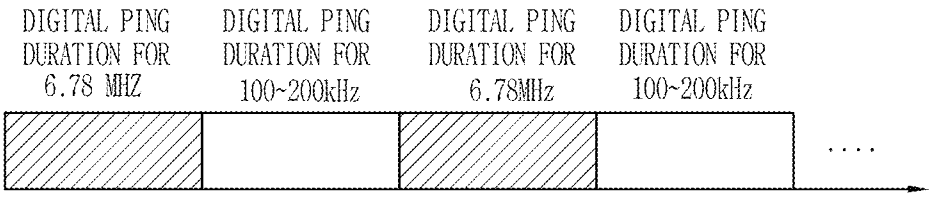
FIG. 30 is a conceptual view illustrating one example of signal processing applicable when a coil of FIG. 29A is used.

FIGS. 29A, 29B and 29C are planar, front and perspective views of another exemplary embodiment disclosed herein, and FIG. 30 is a conceptual view illustrating one example of signal processing applicable when a coil of FIG. 29A is used.

As illustrated in FIGS. 29A, 29B and 29C, the first and second coils overlap each other.

The first coil compliant with the induction method may be a transmitting coil supporting several hundreds of kHz (100~200 kHz), and the second coil compliant with the resonance method may be a transmitting coil supporting an ISM band (6.78 kHz). The two coils may have a vertical interval therebetween or located at the same position in a Z-axis arrangement. Also, the first and second coils may be implemented in a shape of laminating a litz wire or a printed circuit board (PCB) into a double-layer. In this case, a diameter of the first coil may be smaller than that of the second coil, and if the vertical interval is present between the two coils, the first coil may be located above the second coil.

As illustrated in FIG. 30, the transmitter sequentially generates, on the TDM basis, a digital ping signal for waking up a receiving unit having the ISM frequency band and a digital ping signal for waking up a receiving unit having a several-hundred kHz band, and decides a transmission frequency according to information related to a packet sent to the corresponding waken-up receiver. This enables interoperability of the induction and resonance methods.

The transmitter interoperable with the induction method and the resonance method may execute the signal processing and also communication according to a communication method to be explained later.

When one transmitter and a plurality of receivers have to communicate together, the conventional method may not support such communication. This may result from a collision between messages transmitted in the same timeslot when the plurality of receivers transmit the messages to the transmitter at the same time, and generation of errors in the transmitted messages due to the collision. These problems may also be caused equally in unidirectional communication and bidirectional communication. As a result, the transmitter is unable to transmit power due to the collision caused during the communication with the plurality of receivers. The communication method which will be explained herein can solve these problems.

Figure 31:
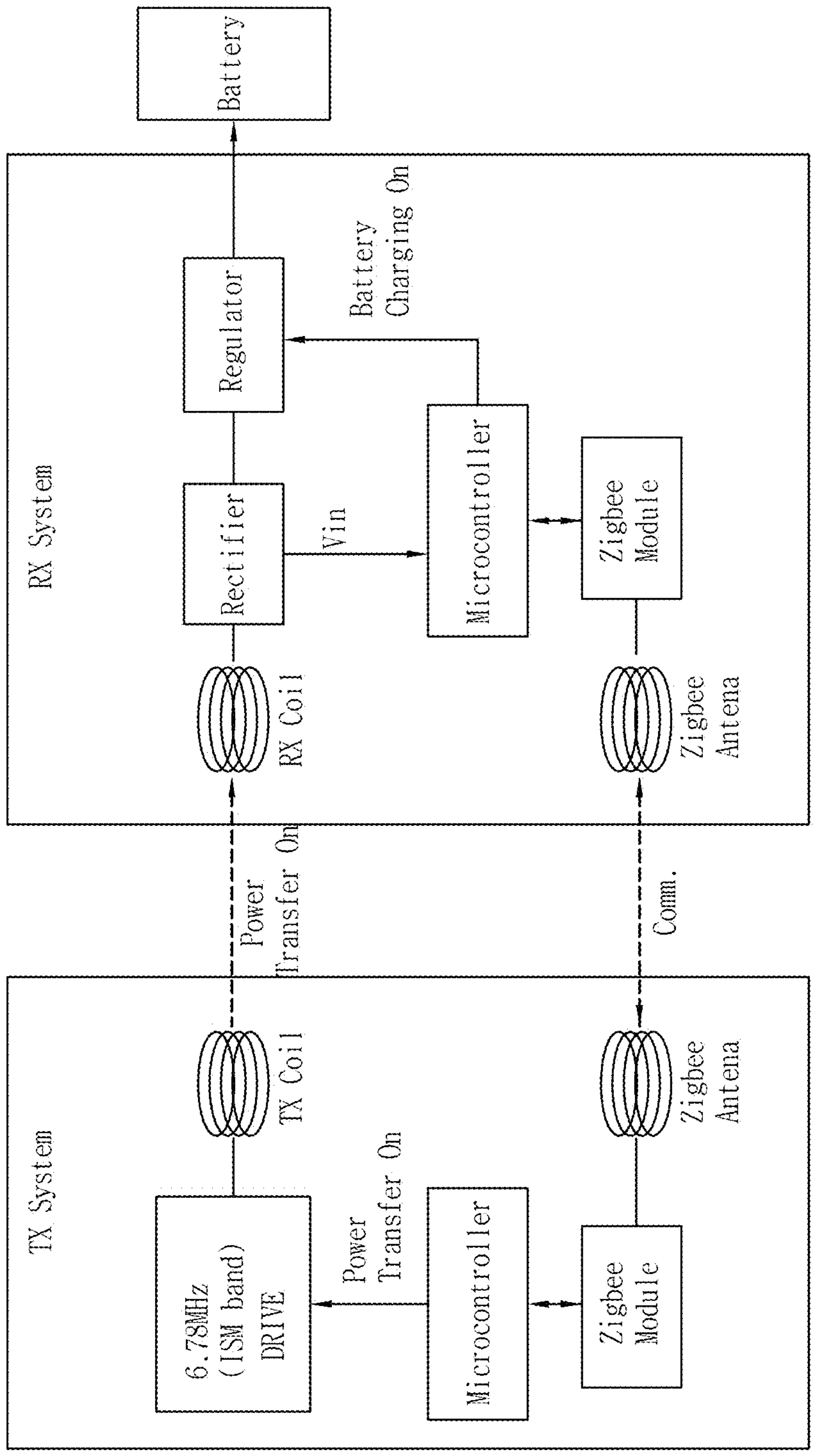
FIG. 31 is a view illustrating TX/RX communication configuration using Zigbee, other than using a wireless power channel.
Figure 32:
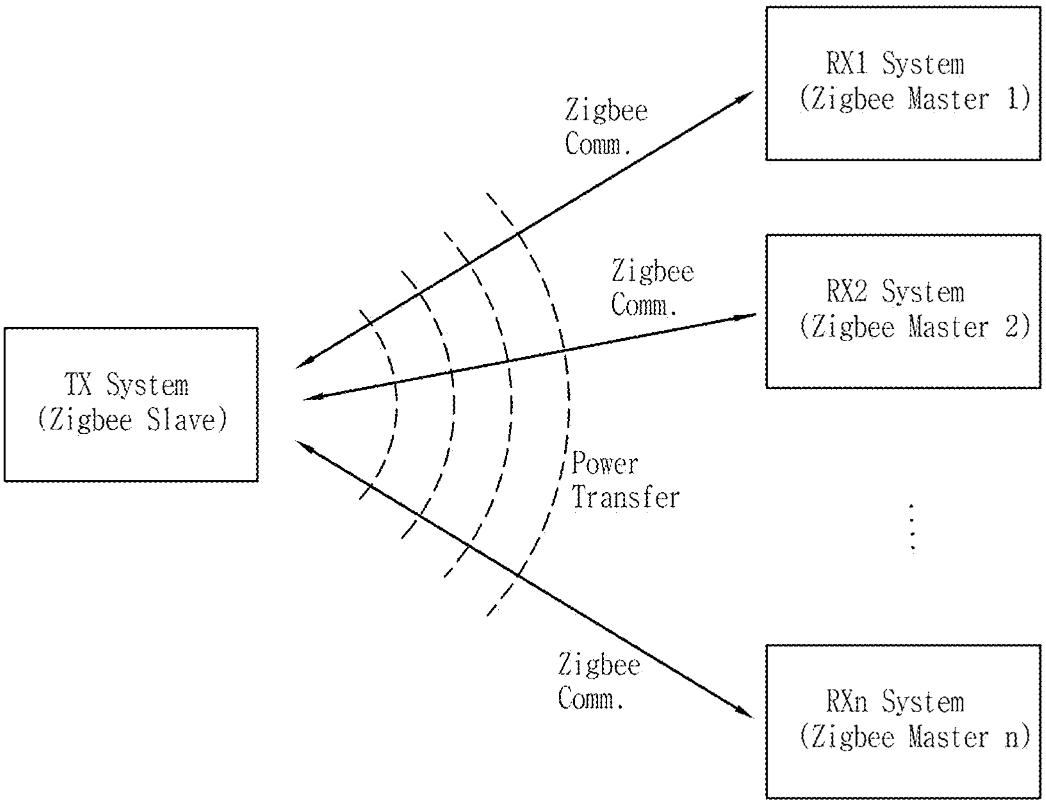
FIG. 32 is a conceptual view illustrating a single charging channel and a multi-communication channel, in multi-charging.

FIG. 31 is a view illustrating TX/RX communication configuration using Zigbee, other than using a wireless power channel, and FIG. 32 is a conceptual view illustrating a single charging channel and a multi-communication channel, in multi-charging.

As illustrated in FIG. 31, the conventional induction method is a method in which a load on a power line is changed and the TX detects the change for communication. The Zigbee may include an external communication IC so as to simplify a circuit. Also, the external communication IC can be fully activated when power is applied from the RX, which enables required information exchange communication prior to supplying power to a battery end.

FIG. 32 illustrates that one TX communicates a plurality of RXs and the RXs respond to inquiries of the TX.

For the communication method, the controller of the wireless power transmitter applies power individually to the first and second coils, and decides one of the induction method and the resonance method for power transmission, according to the response of the wireless power receiver with respect to the power applied.

For example, for power transmission according to the induction method, the wireless power transmitter detects a signal transmitted from the wireless power receiver through WPC-compliant unidirectional communication. On the other hand, for power transmission according to the resonance method, the wireless power transmitter communicates with the wireless power receiver through a bidirectional communication method using a channel except for a power channel. That is, for wireless charging, WPC-compliant In-band communication may be used for induction and Out-band communication for resonance in the induction/resonance-interoperable method.

Figure 33:
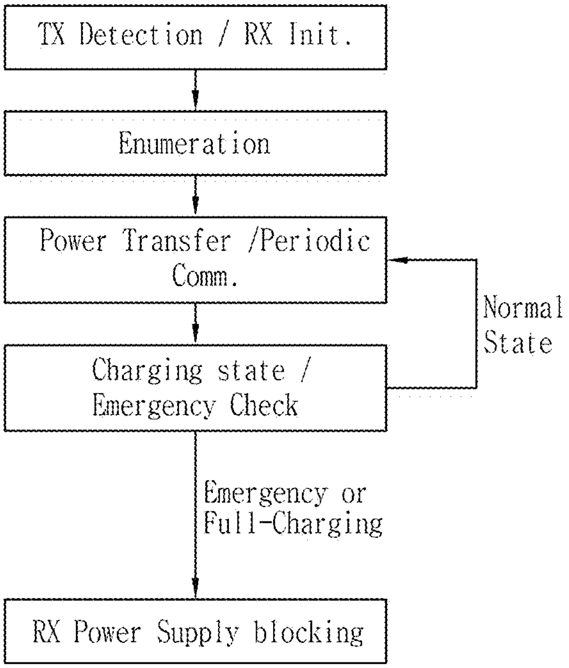
FIG. 33 is a flowchart illustrating a state flow upon a new RX approached.
Figure 34:
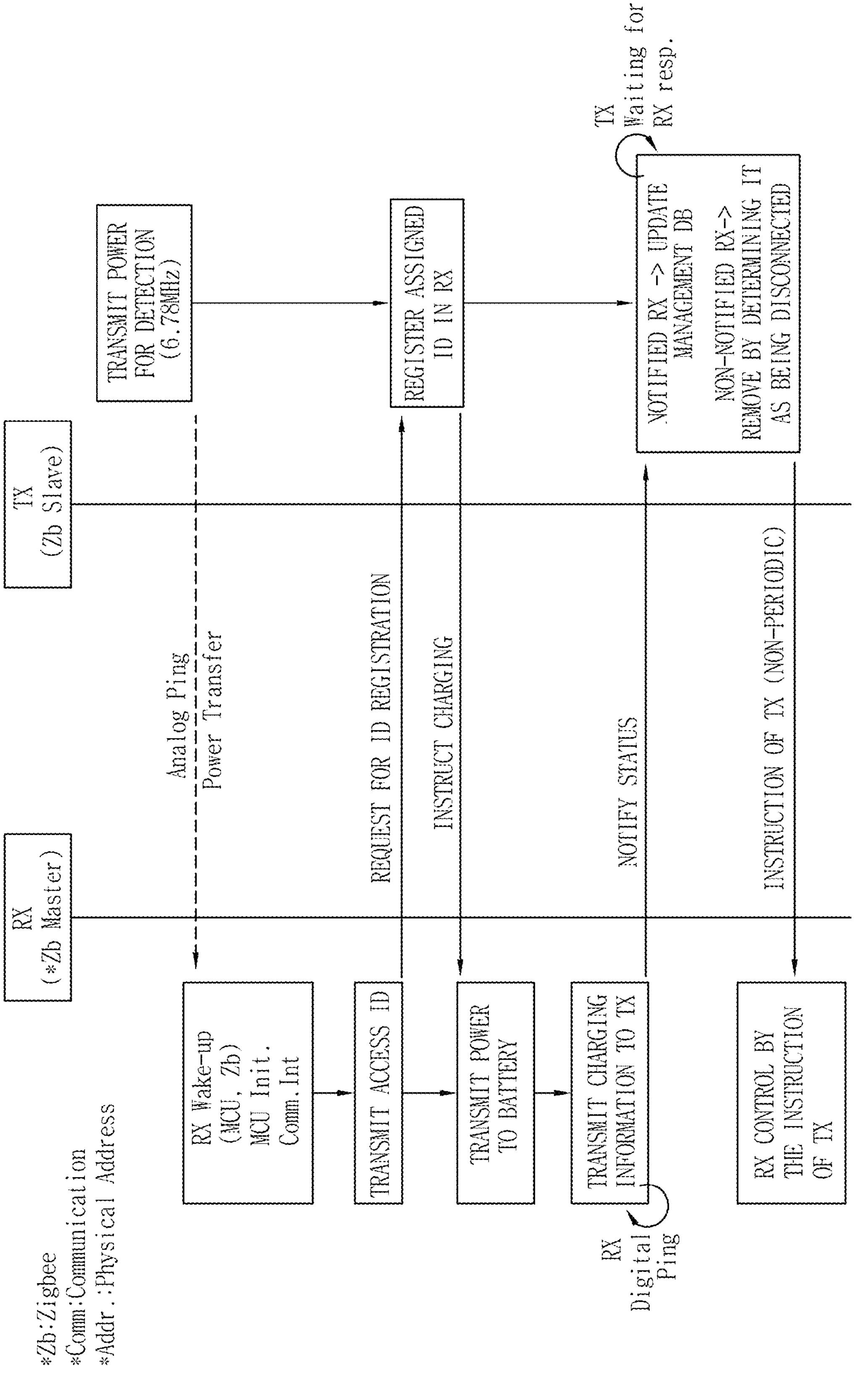
FIG. 34 is a conceptual view illustrating power transmission control communication sequence using Zigbee.
Figure 35:
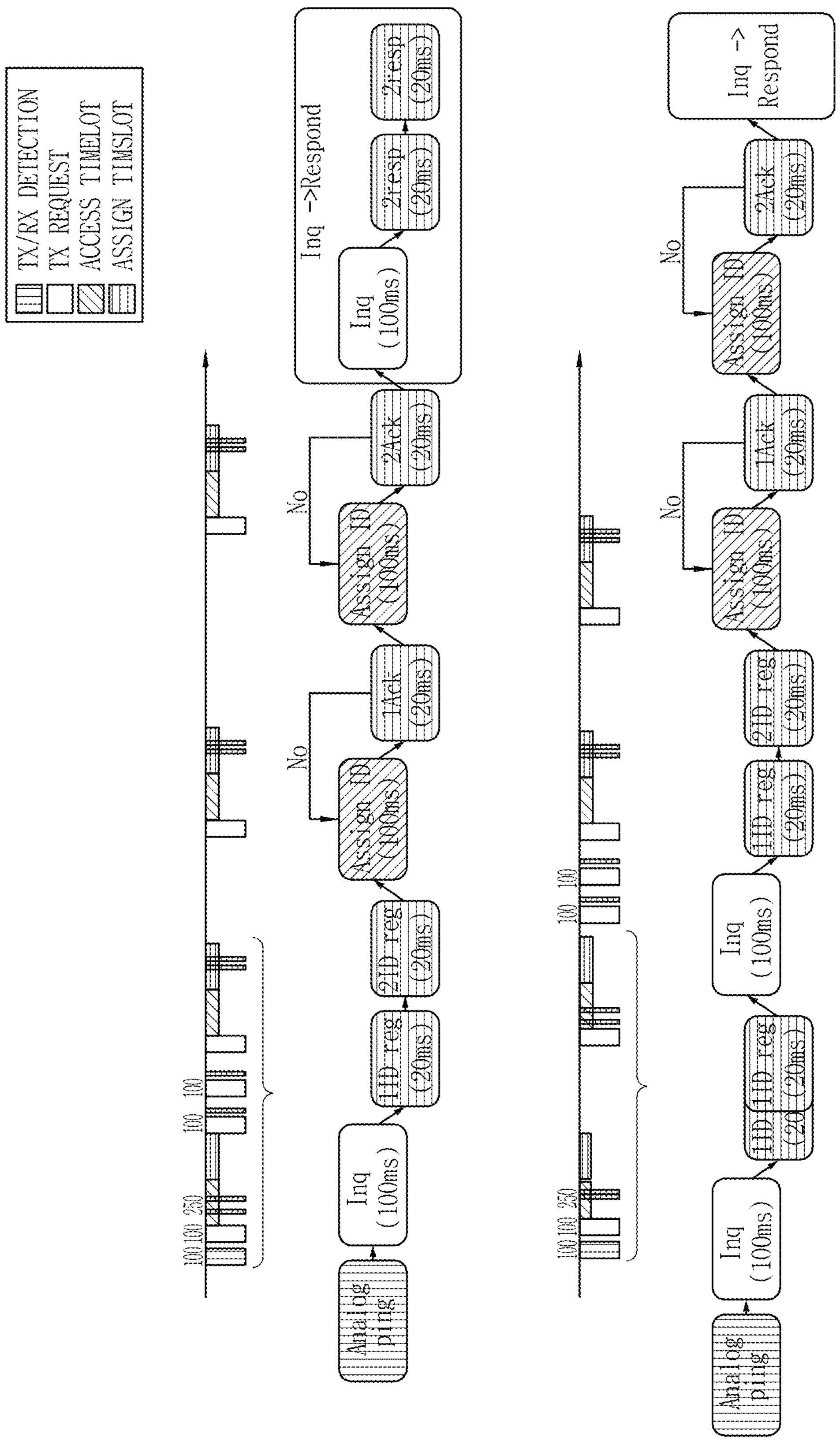
FIGS. 35 and 36 are conceptual views illustrating a half-duplex communication method in bidirectional communication between TX and RX.
Figure 36:
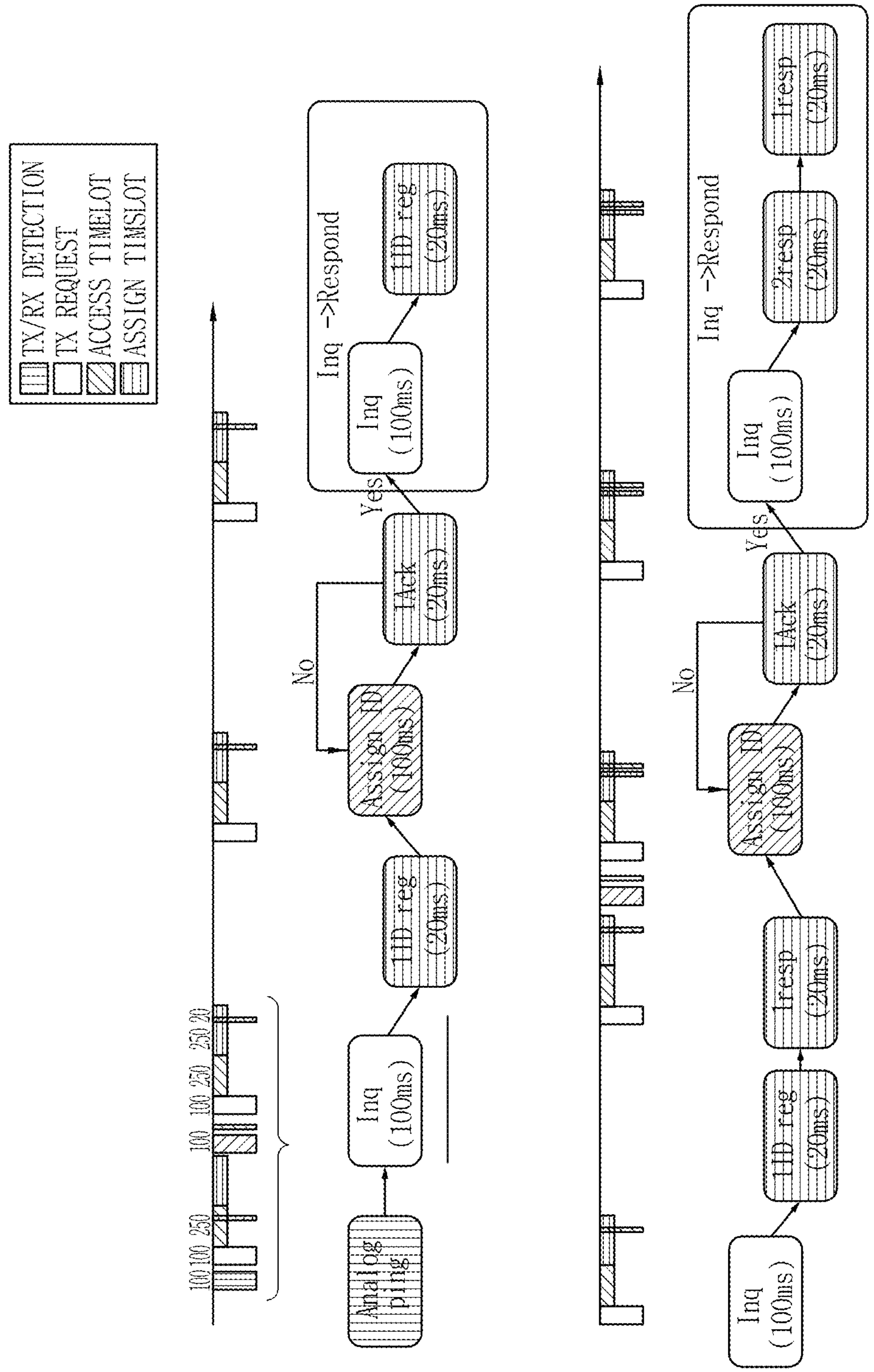
Figure 37:
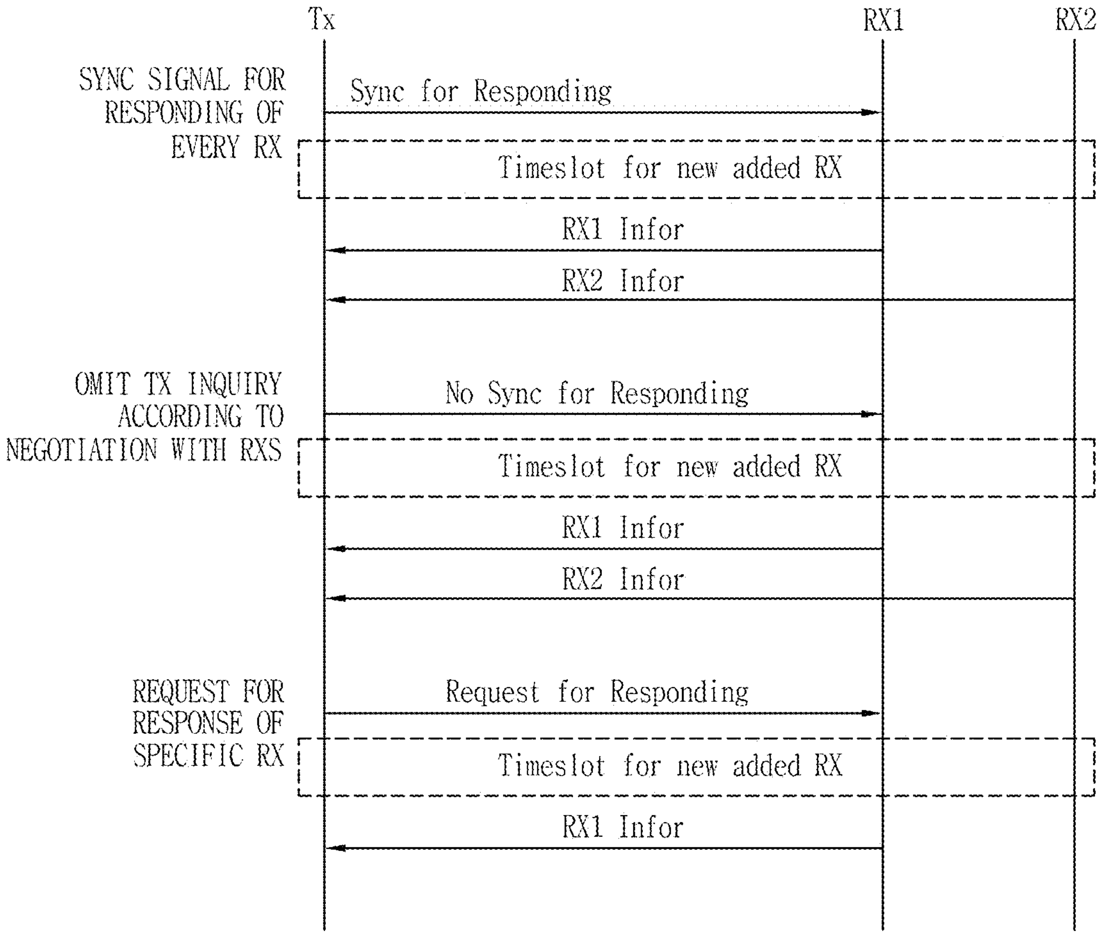
FIG. 37 is an exemplary view illustrating three types of TX inquiries.

FIG. 33 is a flowchart illustrating a state flow upon a new RX approached, FIG. 34 is a conceptual view illustrating power transmission control communication sequence using Zigbee, FIGS. 35 and 36 are conceptual views illustrating a half-duplex communication method in bidirectional communication between TX and RX, and FIG. 37 is an exemplary view illustrating three types of TX inquiries.

As illustrated in those drawings, the induction/resonance-interoperable transmitting unit checks a response of the receiving unit by individually applying power to an induction/resonance coil, and decides a communication method and a power transfer method according to an accessed reception method of the receiver. For example, for using the induction method, the transmitting unit selects unidirectional communication according to a load change of a power channel from the receiving unit to the transmitting unit in the conventional WPC standard. The transmitter then detects it and controls a frequency and a duty ratio of the induction type coil by checking the state of the receiving unit.

On the other hand, for using the resonance method, as the characteristic of the power channel changes according to distance and posture of the transmitting and receiving units, the transmitting unit selects a communication method through a channel other than a power channel, namely, a bidirectional RF communication method, which is capable of acquiring the state of the receiving unit, controlling a frequency and a duty ratio of the transmitting unit, and transmitting an instruction to the receiving unit.

FIGS. 33 and 34 illustrate a process in which TX transmits an analog ping for detecting an RX, detects the RX using such ultra-low power, generates and registers an ID of the RX, and avoids collision of signals when several RXs transmit responses.

Through such negotiation, the TX may receive signals transmitted by new RXs or already-registered RXs without collision even in various cases which may be caused in FIGS. 35 and 36.

FIGS. 35 and 36 illustrate a Half-duplex communication method in the TX/RX bidirectional communication, and here, a time shown in the drawings is a relatively temporary value. FIG. 33 illustrates a case where a signal collision is caused due to an access of a new RX when TX applies power while another RX is already present. By virtue of a time interval between a first inquiry and a second inquiry, a first ID and a second ID are not collided with each other.

On the other hand, FIG. 36 illustrates a case where a new RX accesses when an assigned RX is present. A signal collision due to the assigned RX is not caused.

Also, as illustrated in FIG. 37, the TX may inquire the RX according to three methods, namely, responses of all the RXs, a response of a specific RX, and responses of all the RXs under assumption that there is inquiry although any inquiry is not actually given.

For example, the bidirectional communication method includes a step of assigning by the wireless power transmitter a timeslot and providing an ID for access to the wireless power receiver. For example, bidirectional RF communication takes a manner that the receiving unit responds to a request of the transmitting unit. The receiver which has received initial power then requests for registration using an access ID. When it is determined that the receiving unit can be managed in an allowance timeslot manner, the transmitting unit assigns a timeslot to the corresponding receiving unit and provides the access ID to the receiving unit.

The timeslot refers to a method in which the receiving unit transmits a response after a delay time provided thereto when the transmitting unit requests for the response of the receiving unit. When there are several receiving units, they have different timeslots, so as to avoid signal collision.

Also, the transmitting unit may transmit an instruction to the receiver according to two methods. One of the two methods is that every receiving unit transmits (notifies) information related to a corresponding instruction in a timeslot, and the other method is that a specific receiving unit transmits information in a corresponding timeslot when the corresponding receiving unit is requested or instructed to transmit such information.

The timeslot may be provided with an access timeslot and an assigned timeslot. The access timeslot may be a timeslot in which the wireless power receiver generates an individual access ID in response to power applied thereto and transmits the generated access ID to the wireless power transmitter. Also, the assigned timeslot may be a timeslot in which the plurality of receivers sequentially respond to the wireless power transmitter based on assigned IDs applied from the wireless power transmitter.

The access timeslot and the assigned timeslot may be located by being separated from each other on a time axis. Here, the access timeslot refers to a timeslot in which the receiving unit randomly generates an individual access ID in response to initial power applied thereto, and transmits information related to the generated access ID. The access timeslot refers to a timeslot in which a plurality of receiving units registered transmit responses without collision based on access IDs applied by the transmitting unit.

In such a manner, the bidirectional communication method is a method in which the wireless power receiver transmits a response to a request of the wireless power transmitter. However, the request may be omitted, and the wireless power receiver may also transmit a response in the assigned timeslot. That is, from the perspective of communication minimization, an inquiry of the transmitting unit may be omitted according to negotiation with RXs, and the RXs may unilaterally transmit responses in the assigned timeslot.

As described above, the induction/resonance-interoperable coil and communication method thereof disclosed herein proposes a transient method for improving the already-commercialized induction type wireless charging method to the resonance method.

It will be easily understood by those skilled in the art that the configuration of the wireless power transmitter according to the foregoing embodiments disclosed herein can be applied even to devices, such as a docking station, a cradle device, other electronic devices, and the like, except for a case of being applicable only to a wireless charger.

The scope of the present disclosure may not be limited to the foregoing embodiments disclosed herein, and the present disclosure can be modified, varied or improved into various forms within the idea of the present disclosure and the scope of the claims.

The invention claimed is:

1. A wireless power transmitter configured to wirelessly transmit power to a wireless power receiver, the wireless power transmitter comprising:

a first coil configured to generate a first magnetic field for transmitting power via inductive coupling to the wireless power receiver;

a second coil wound around the first coil and configured to generate a second magnetic field vibrating at a resonant frequency for transmitting power via resonant inductive coupling to the wireless power receiver; and a controller configured to:

cause transmission of a detection signal comprising a wireless power signal;

determine a wireless power transmission protocol corresponding to inductive coupling or resonant inductive coupling based on a control message response to the detection signal received from the wireless power receiver; and cause power to be selectively applied to the first coil or the second coil according to the control message response from the wireless power receiver.

2. The wireless power transmitter of claim 1, wherein a Q value of the second coil is in the range of 100 to 200.

3. The wireless power transmitter of claim 1, wherein a ratio of an edge impedance real number part to a central impedance real number part of the second coil is greater than 1.2.

4. The wireless power transmitter of claim 3, wherein a ratio of an edge impedance imaginary number part to a central impedance imaginary number part of the second coil is smaller than 1.

5. The wireless power transmitter of claim 1, wherein the second coil is formed in a flat spiral structure, and an interval of the second coil is non-uniform.

6. The wireless power transmitter of claim 5, wherein the interval of the second coil gradually becomes more narrow from an inner circumference toward an outer circumference of the second coil.

7. The wireless power transmitter of claim 5, wherein the second coil is formed in a shape in which a single wire of a litz wire or a copper wire is wound from an inner circumference to an outer circumference.

8. The wireless power transmitter of claim 1, wherein the first coil is wound into a circular shape, and the second coil is wound into a quadrilateral shape at least part of which is linear.

9. The wireless power transmitter of claim 1, wherein a signal transmitted from the wireless power receiver is detected via a first unidirectional communication protocol when the power is transmitted via inductive coupling.

10. The wireless power transmitter of claim 1, wherein communication with the wireless power receiver is executed via a bidirectional communication protocol using a channel, other than a power channel, when the power is transmitted via resonant inductive coupling.

11. The wireless power transmitter of claim 10, wherein the wireless power transmitter assigns a timeslot and provides an access ID to the wireless power receiver according to the bidirectional communication protocol.

12. The wireless power transmitter of claim 11, wherein the timeslot comprises:

an access timeslot in which the wireless power receiver generates an individual access ID in response to power applied thereto and transmits the generated access ID to the wireless power transmitter; and an assigned timeslot in which a plurality of wireless power receivers sequentially transmit responses based on assigned IDs applied from the wireless power transmitter.

13. The wireless power transmitter of claim 10, wherein according to the bidirectional communication protocol:

the wireless power receiver transmits a response to a request of the wireless power transmitter; or the wireless power receiver omits the request and transmits a response in an assigned timeslot.

14. A wireless charging system comprising:

a transmitter configured to transmit power wirelessly and comprising a first coil configured to transmit power via inductive coupling and a second coil configured to transmit power via resonant inductive coupling; and a receiver configured to wirelessly receive power from the transmitter, wherein the transmitter is configured to:

transmit a detection signal comprising a wireless power signal;

determine a wireless power transmission protocol between inductive coupling or resonant inductive coupling based on a control message response to the detection signal received from the receiver; and selectively apply power to the first coil or the second coil according to the control message response received from the receiver.

15. The system of claim 14, wherein the receiver transmits a list of supported communication protocols to the transmitter, and the transmitter transmits to the receiver one or more supported communication protocols of the list which are supported by the transmitter.

16. The system of claim 14, wherein:

a signal transmitted from the receiver is detected via a first unidirectional communication protocol when the power is transmitted via inductive coupling, and communication with the wireless power receiver is executed via a bidirectional communication protocol using a non-power channel when the power is transmitted via resonant inductive coupling.

17. The system of claim 16, wherein the transmitter assigns a timeslot and provides an access ID to the receiver in the bidirectional communication protocol.

18. The system of claim 14, wherein a Q value of the second coil is in the range of 100 to 200.

19. The system of claim 14, wherein the second coil is formed in a flat spiral structure, and an interval of the second coil is non-uniform.

* * * * *